United States Patent [19]

Wagner

[11] Patent Number: 4,780,770
[45] Date of Patent: Oct. 25, 1988

[54] METHOD AND APPARATUS FOR SEPARATING AND INDIVIDUALLY CORRECTING REPETITIVE AND RANDOM VELOCITY ERRORS

[75] Inventor: Steven D. Wagner, Belmont, Calif.

[73] Assignee: Ampex Corporation, Redwood City, Calif.

[21] Appl. No.: 876,943

[22] Filed: Jun. 20, 1986

[51] Int. Cl.$^4$ .............................................. H04N 5/95
[52] U.S. Cl. .................................... 358/337; 358/326; 360/36.1
[58] Field of Search ................ 358/314, 320, 324, 325, 358/326, 36, 336, 337, 338, 167; 360/26, 36.1

[56] References Cited

U.S. PATENT DOCUMENTS

| 4,321,619 | 3/1982 | Kamaty | 358/326 |
| 4,393,413 | 7/1983 | Kaneko | 360/36.1 |
| 4,709,276 | 11/1987 | Yoshinaka | 358/326 |

OTHER PUBLICATIONS

Ampex Corp. Service Manual, Zeus 1, Advanced Video Processor, Sections 10 and 11, catalog #1809690, Oct. 85.

"A New Technique for Time-Base Stabilization of Video Recorders," Coleman, IEEE Trans. on Broadcasting, vol. 17, No. 1, pp. 24-36.

Primary Examiner—Russell E. Adams
Attorney, Agent, or Firm—George B. Almeida; Richard P. Lange

[57] ABSTRACT

Velocity errors in a video signal are sampled at scan line rate and are averaged over a selected plurality of frames to enhance the repetitive velocity errors while cancelling the random velocity errors. The resulting separated repetitive velocity errors then are subtracted from the initial combined velocity errors to provide separated random velocity errors. A repetitive error interlace technique is used to generate an improved repetitive error frequency control signal, while a second order correction technique provides a corresponding random error frequency control signal. The two frequency control signals are combined and the combined signal is used to provide compensation for the initial velocity errors.

36 Claims, 14 Drawing Sheets

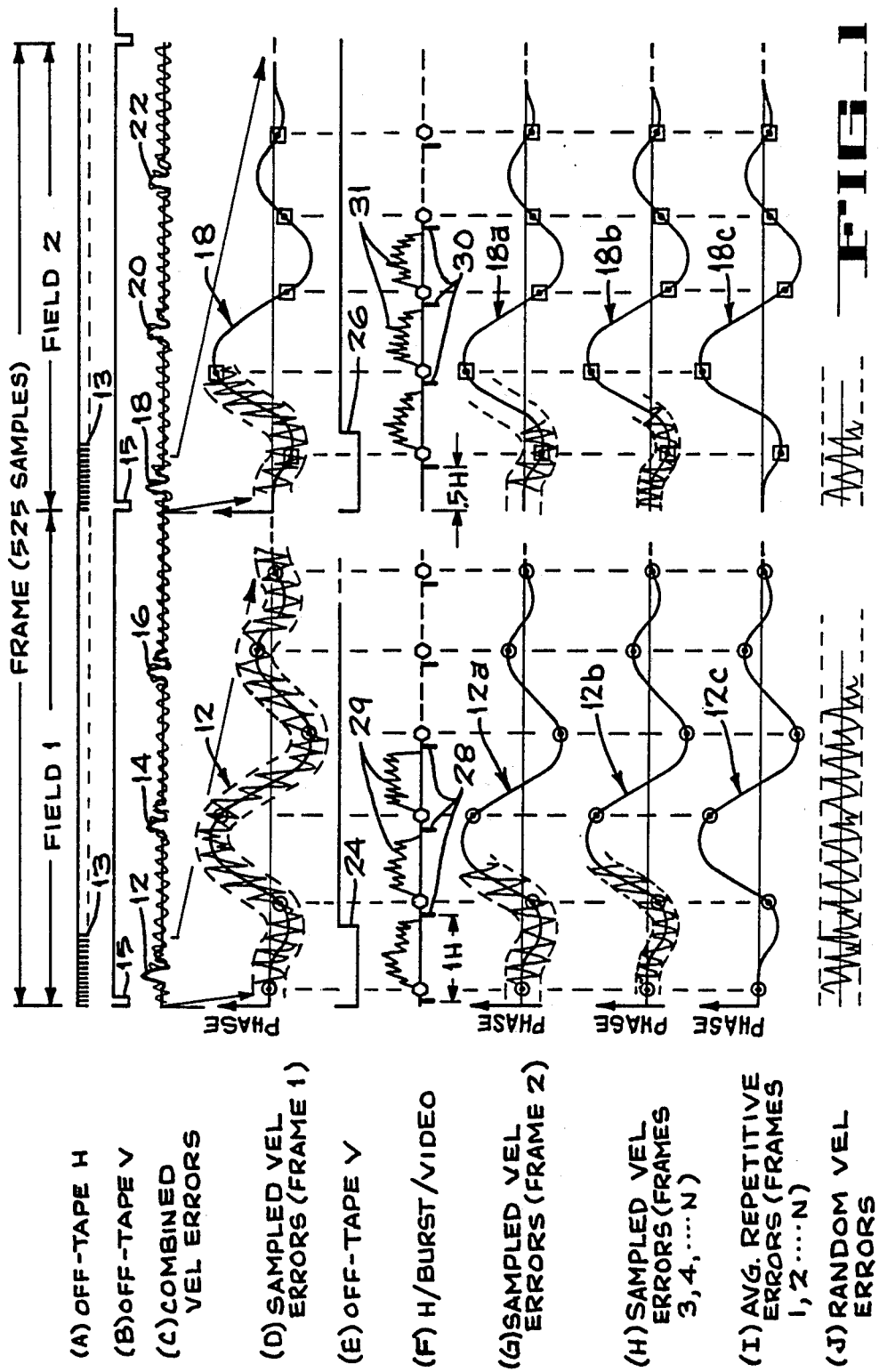

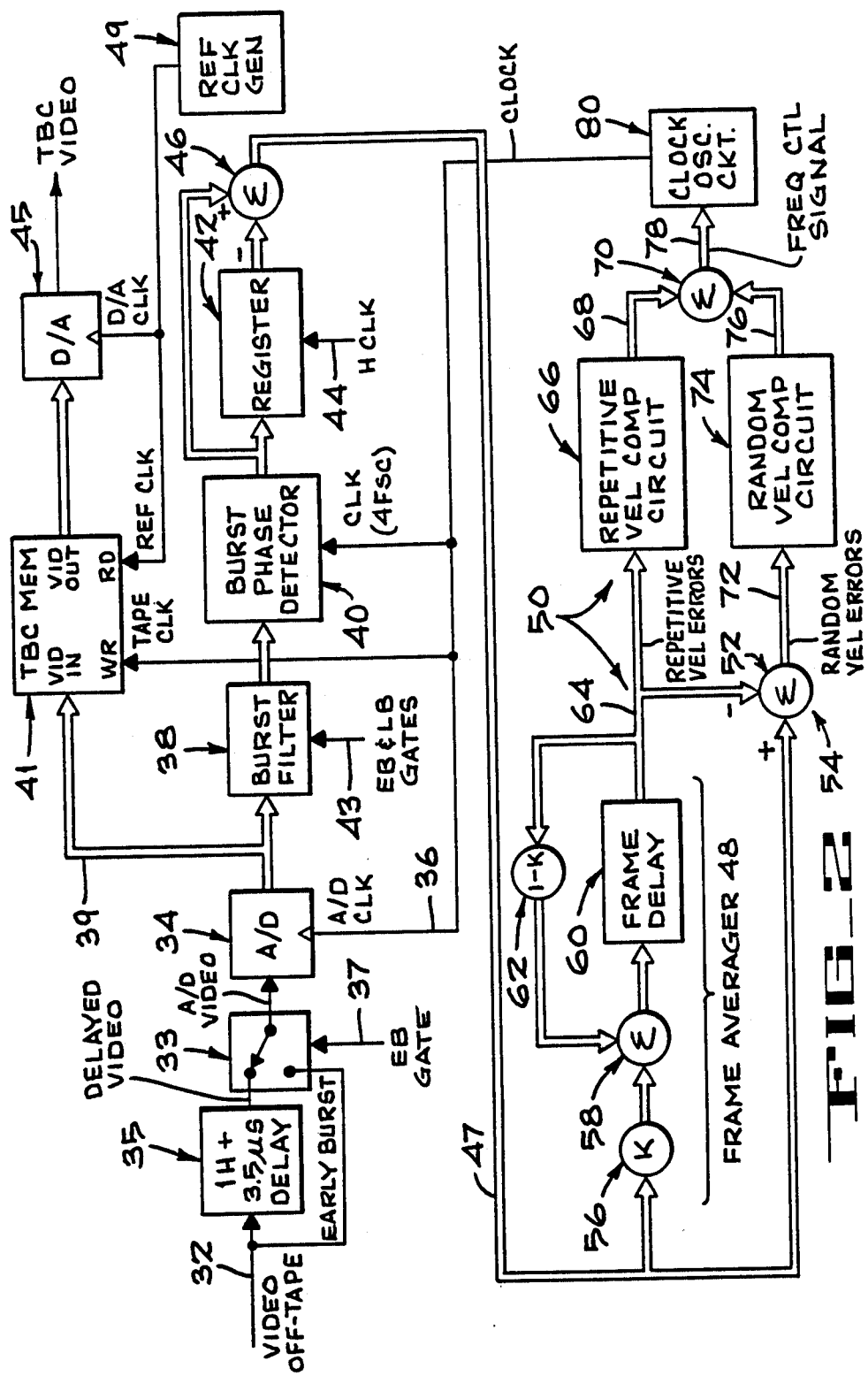
FIG_2

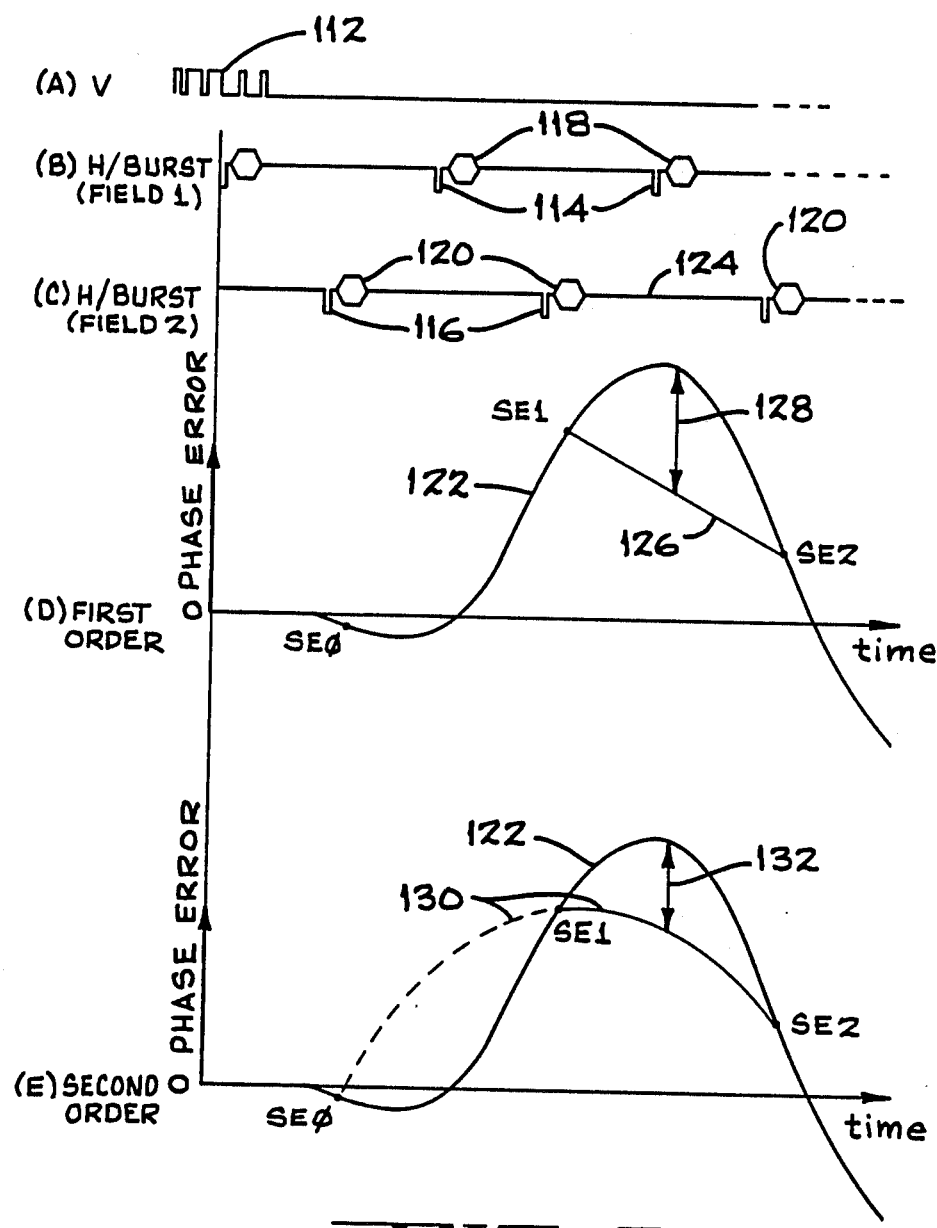
FIG_3 (PRIOR ART)

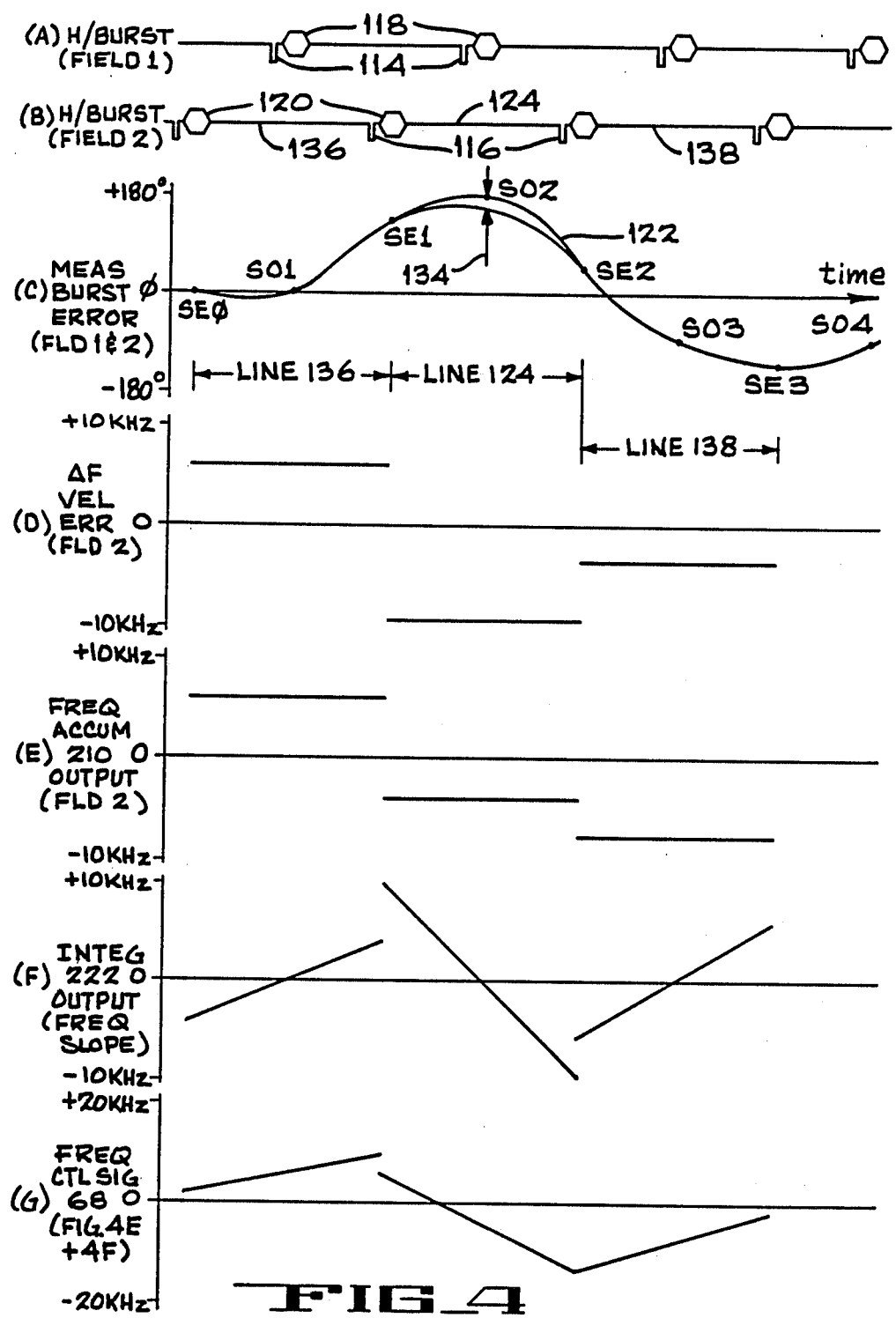

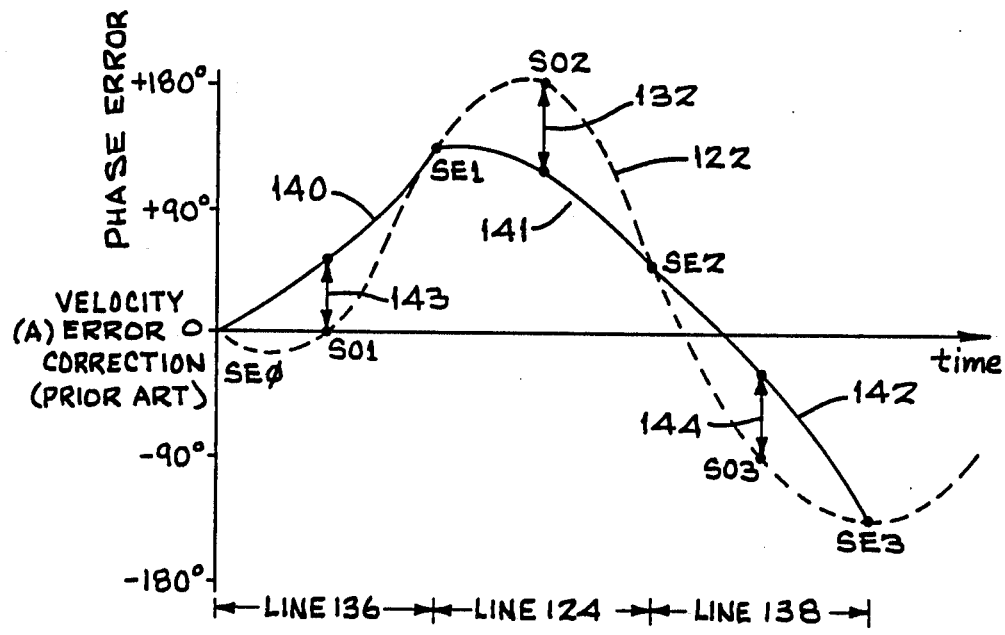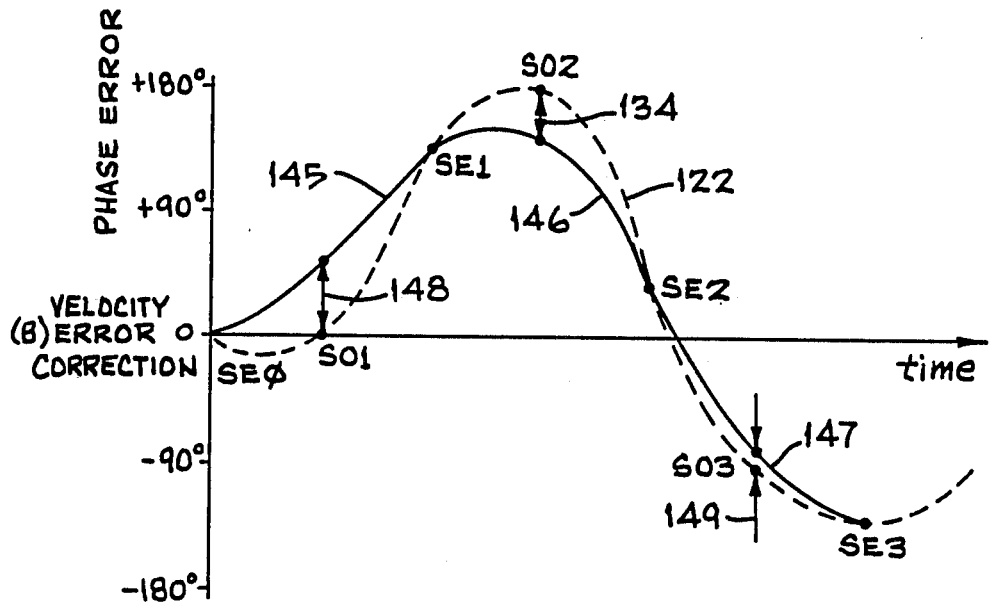
FIG_5

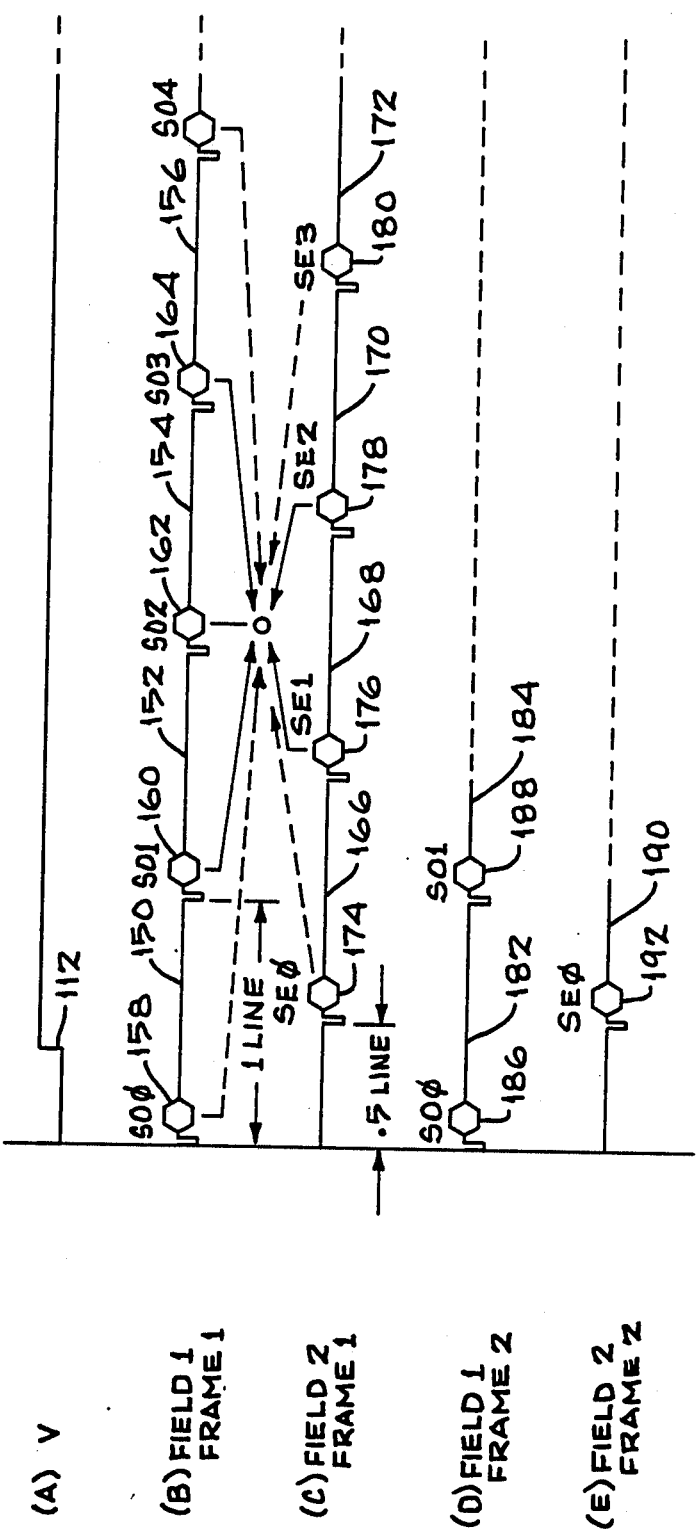

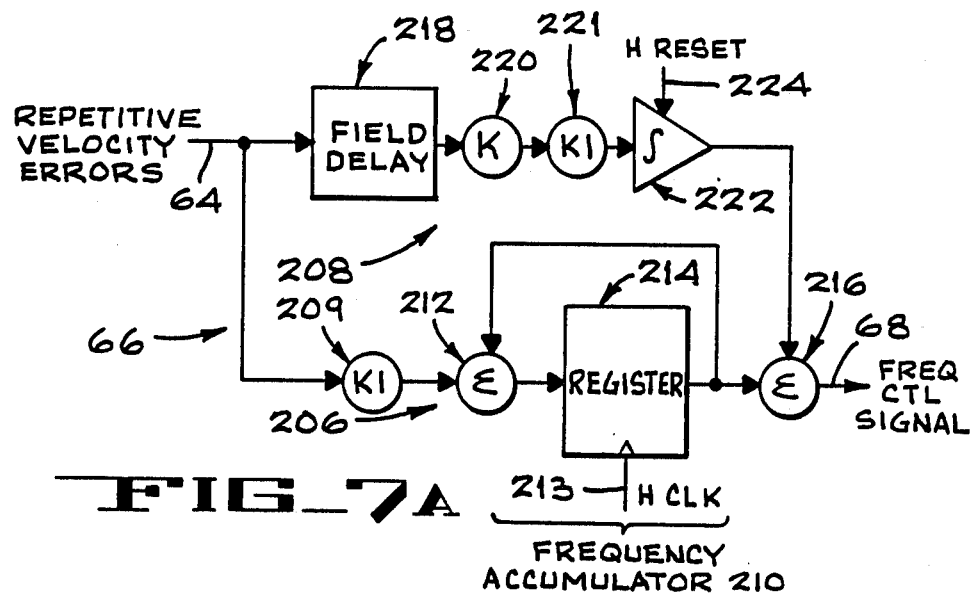
FIG_7A
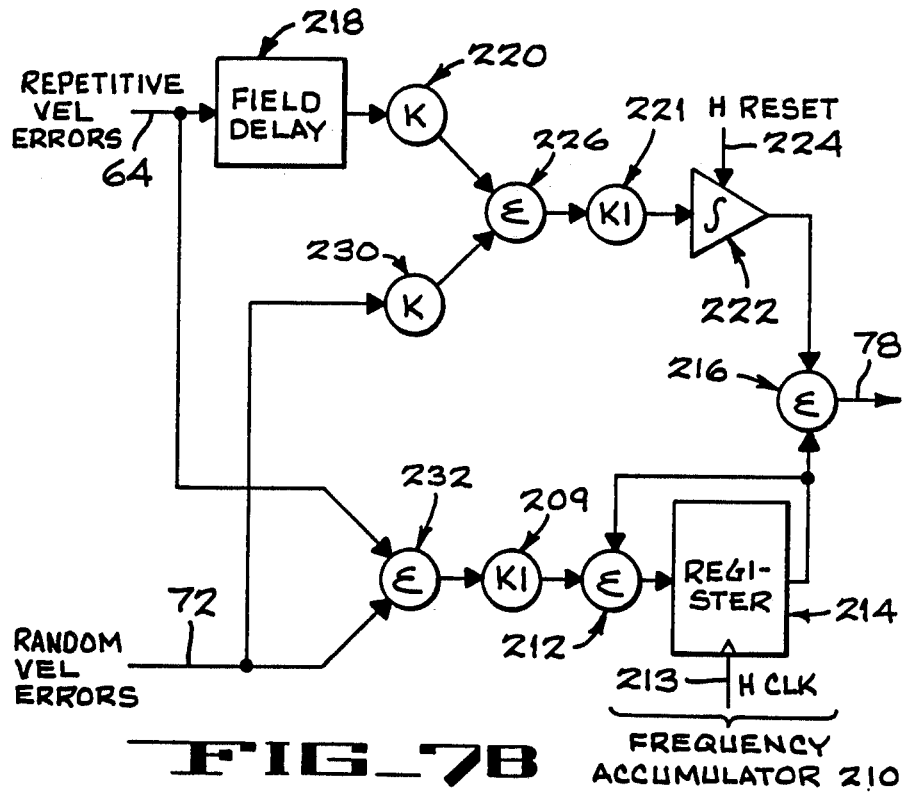
FIG_7B

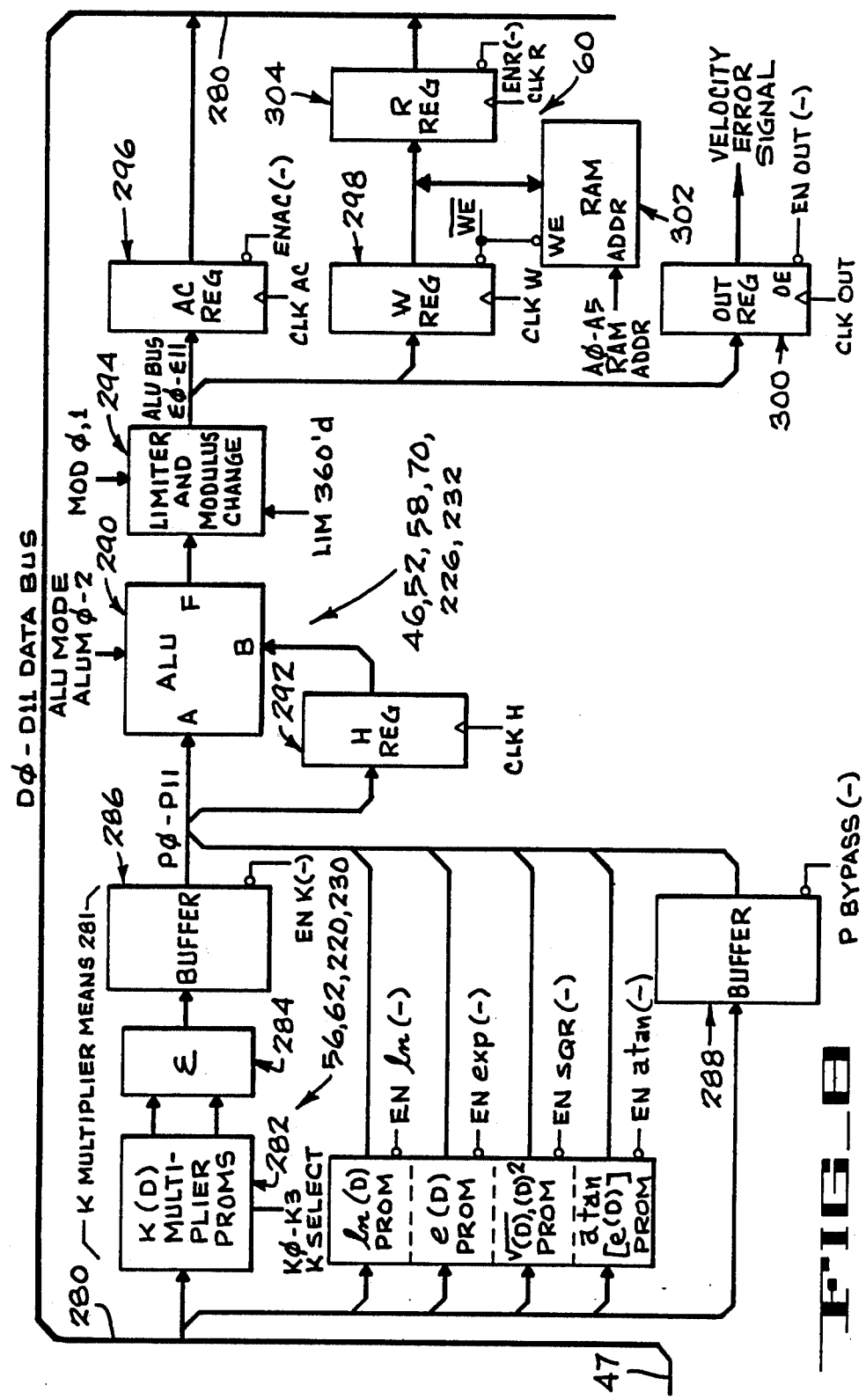
FIG_8

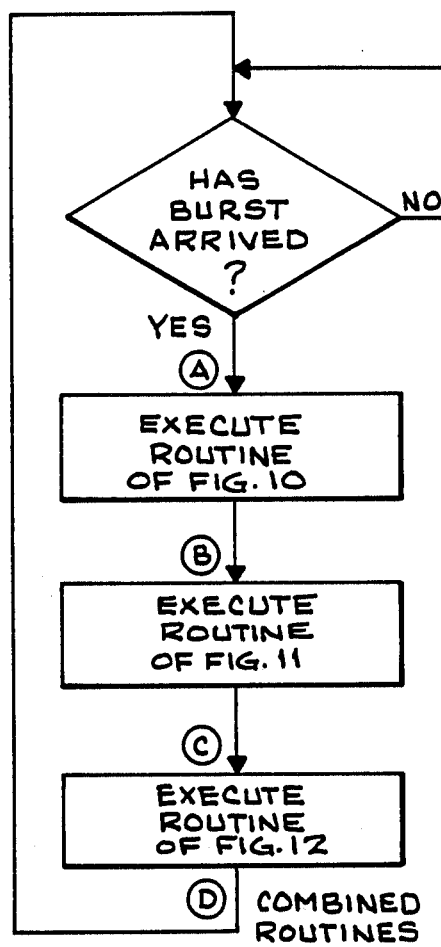
FIG_9
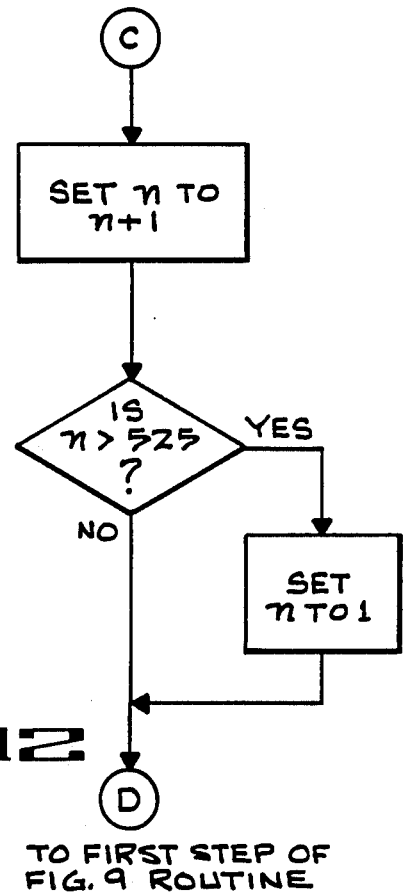
FIG_12
RAM ADDRESS
INCREMENTING
ROUTINE

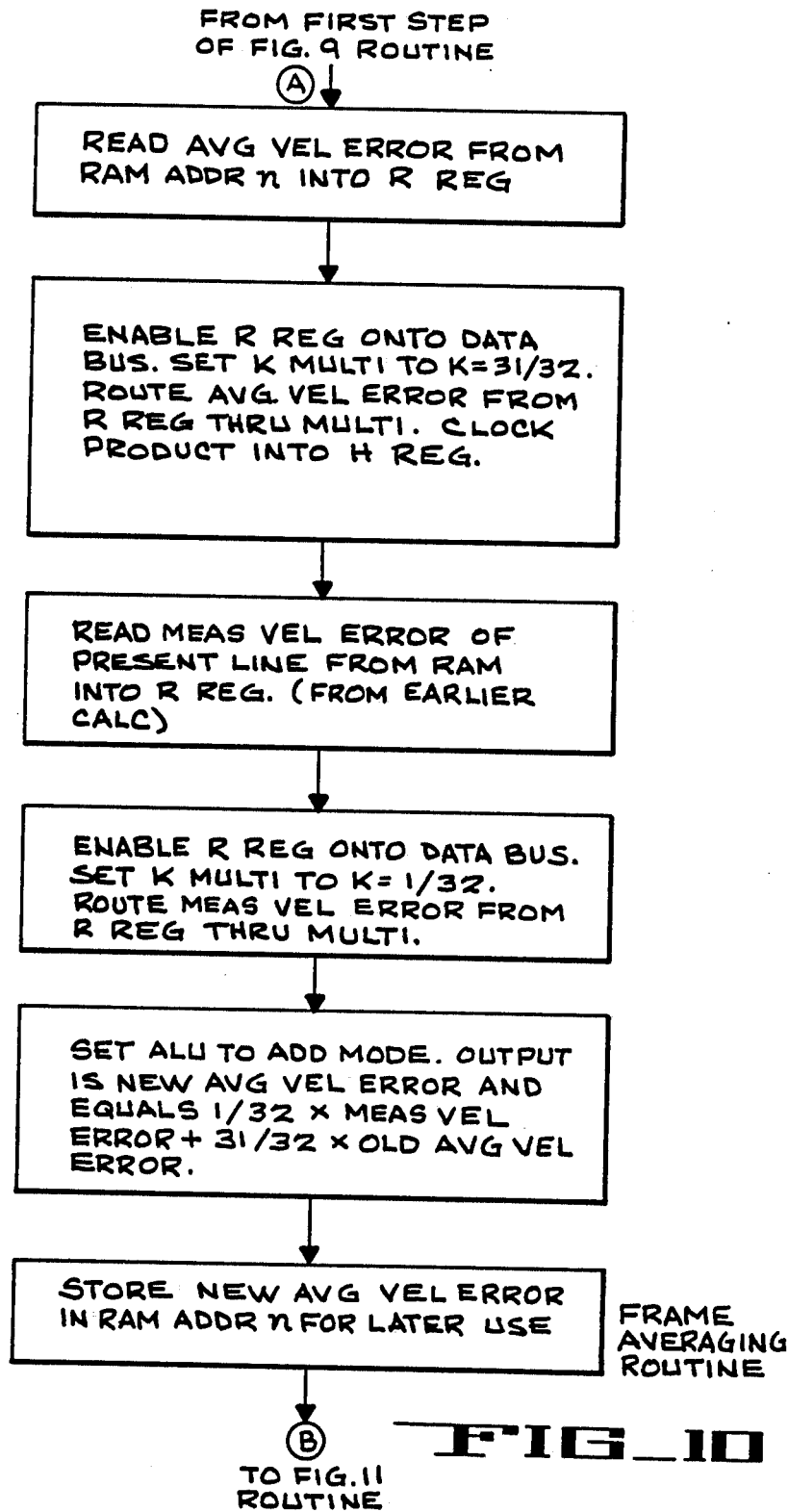

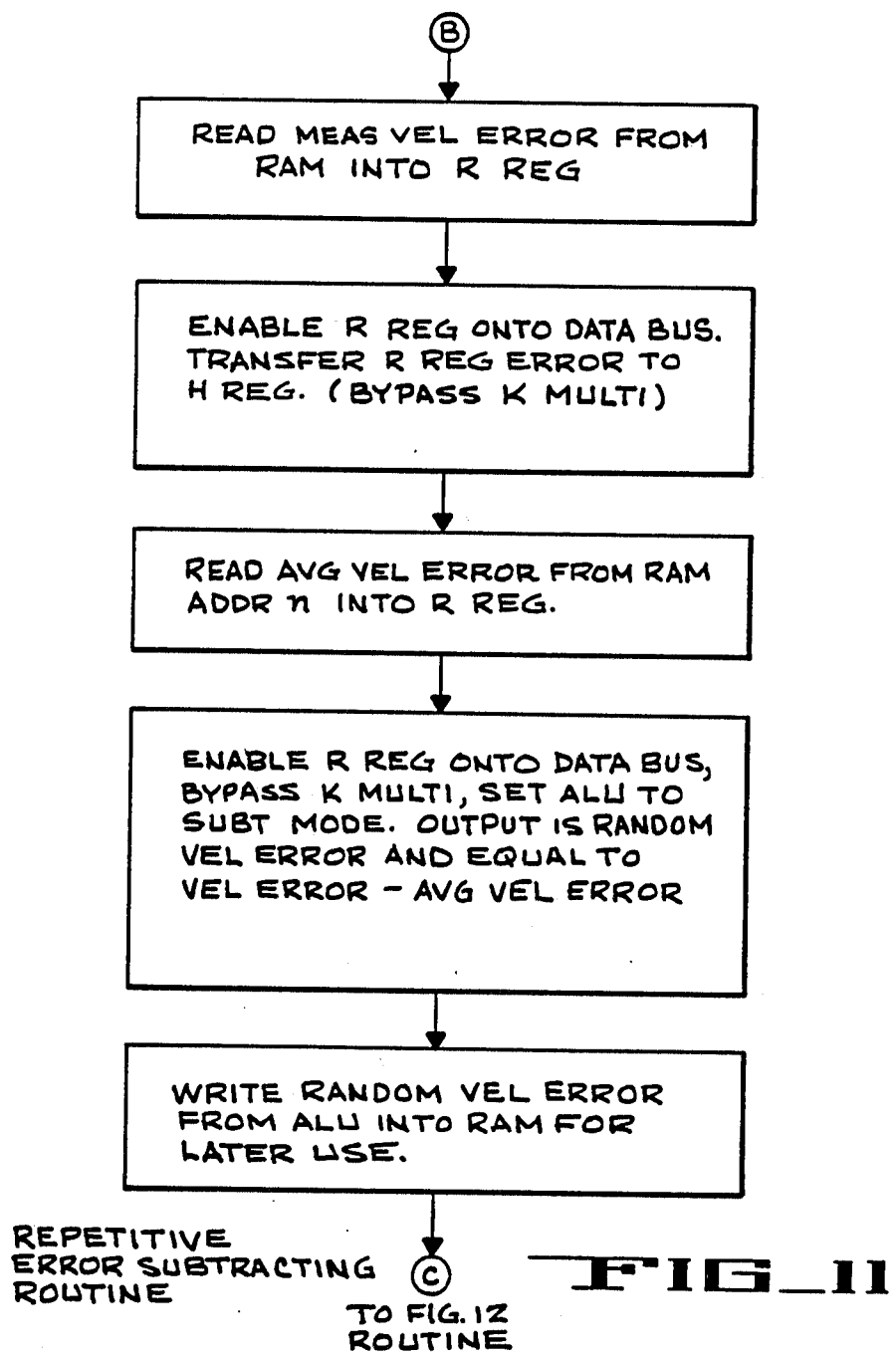
FIG_11

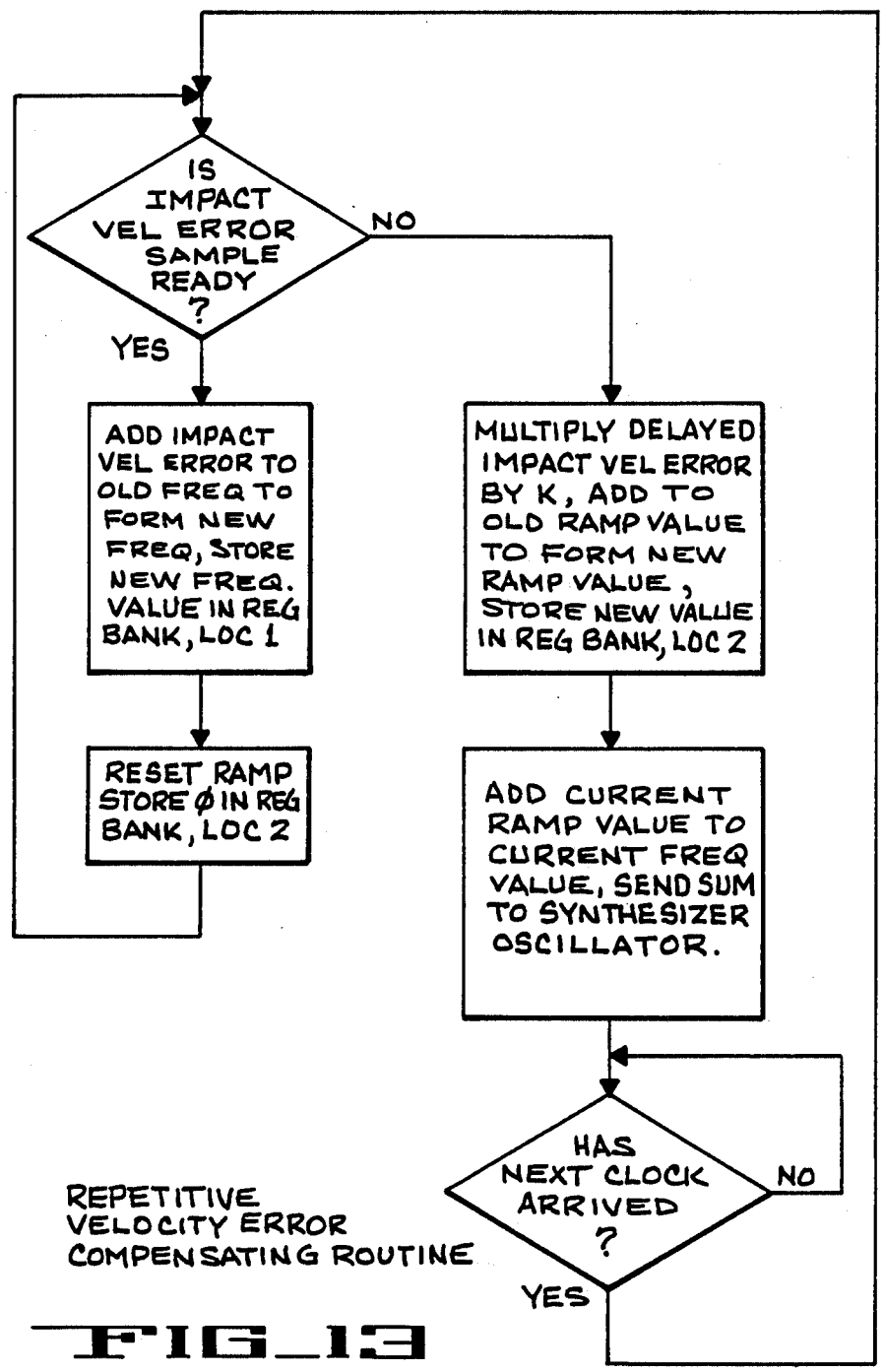

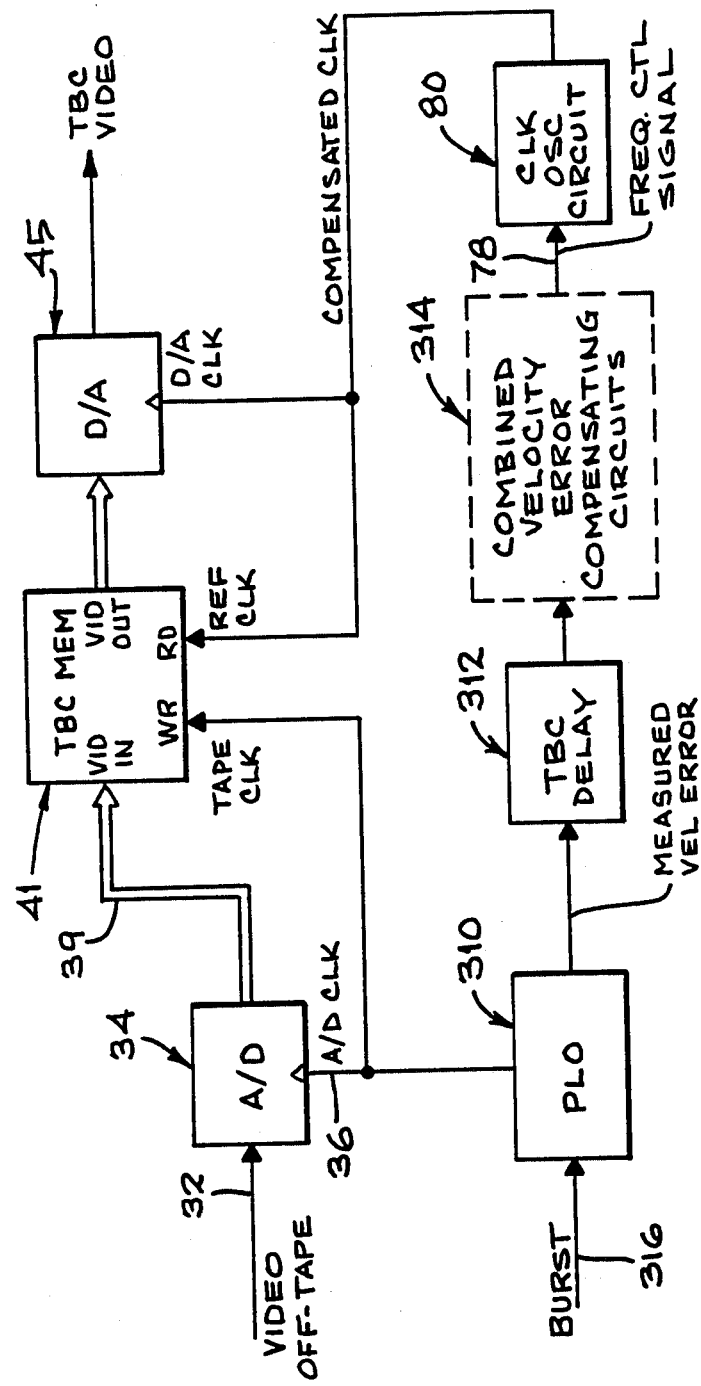
FIG_14

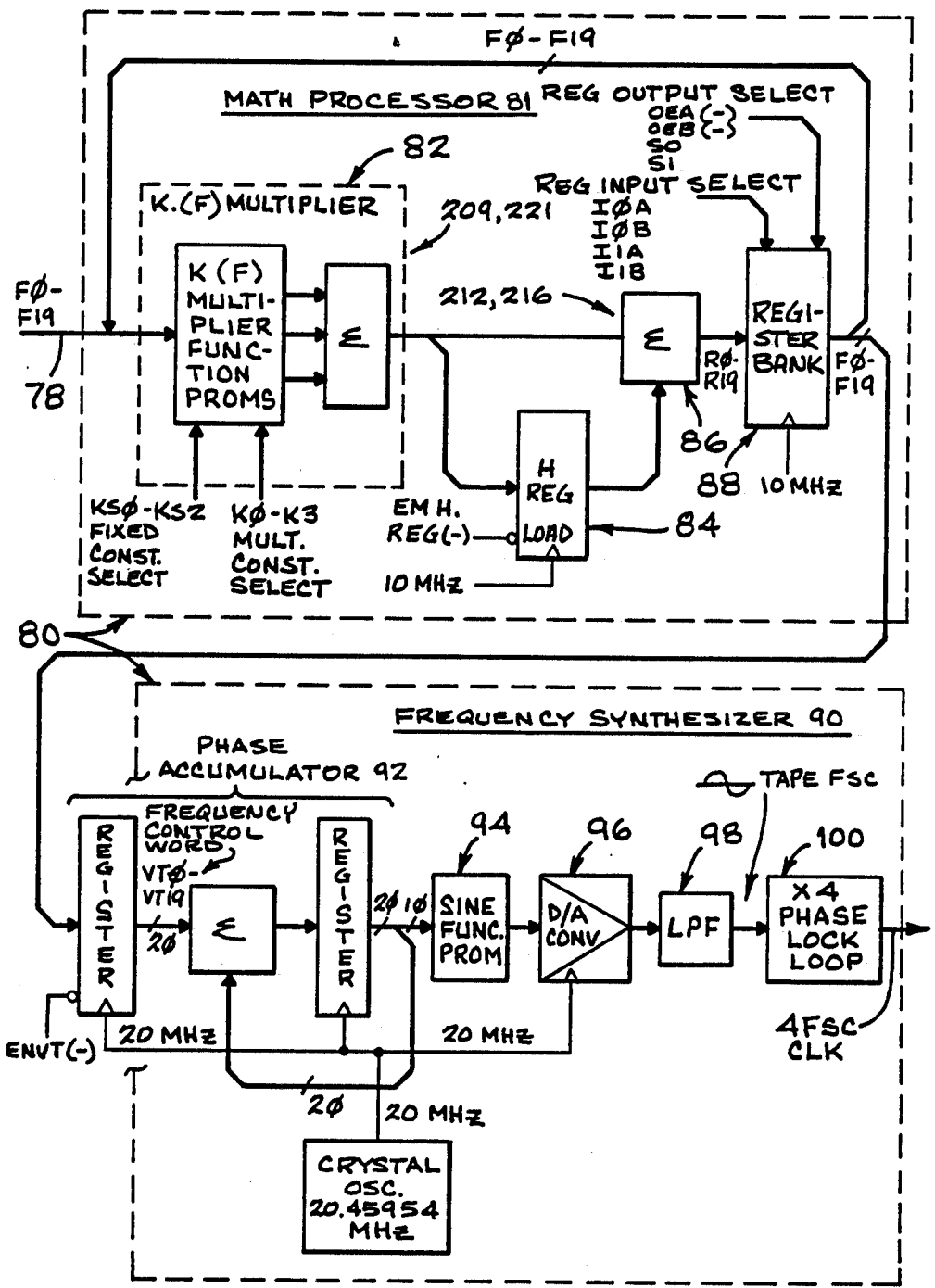
FIG_15

METHOD AND APPARATUS FOR SEPARATING AND INDIVIDUALLY CORRECTING REPETITIVE AND RANDOM VELOCITY ERRORS

BACKGROUND AND SUMMARY OF INVENTION

The invention relates to velocity error compensation in a video time base corrector and particularly to a method and apparatus for separating repetitive and non-repetitive velocity errors in a video signal, and for generating separate repetitive and non-repetitive velocity error compensation signals which then are combined and used to provide optimum compensation for velocity errors experienced by the signal.

In the field of color television, and in the reproduction of color video information signals, stability requirements are one of the critical parameters which must be addressed in order to reduce time base errors, thereby preserving the necessary color quality in the reproduced color video information. One of the causes of instability is referred to as velocity error, which is produced by a variety of operating conditions some of which include geometric errors, tape tension variations and ambient temperature and humidity changes. As in the case of all time base errors affecting stability, velocity errors result from differences which occur between the effective head-to-tape speeds during the record and reproduce processes. These errors are manifested as phase shifts between color bursts from horizontal line to horizontal line, and produce a progressive phase shift of the color video signal during the interval between bursts of respective horizontal lines of the signal. This progressive phase shift is what is commonly referred to as the velocity error.

When reproducing the video signal it is necessary to compensate for these velocity errors, and this typically is achieved through the use of a time base corrector which adjusts the phase of the video information signal in accordance with the detected positional error of each horizontal synchronizing pulse and a detected phase error of each color burst. This procedure corrects the video signal at the start of each horizontal line but does not eliminate the disturbing effect caused by the erroneous progressive phase shift that occurs during the scan line and which remains uncorrected until the end of the line when the next correction is made. More particularly, in a digital time base corrector of the type wherein velocity error compensation is performed prior to the input thereto, to prevent velocity errors from occurring the digitizing sample clock must follow any variations in the off-tape video signal frequency as it is being reproduced. Any error which occurs between the clock signal and the off-tape video signal will cause the progressive phase errors of previous mention, which are commonly known in the art as hue errors and are readily visible color disturbances in the video picture. In another type of time base corrector, the velocity errors are corrected at the digital-to-analog (D/A) converter coupled downstream of the time base corrector to remove the progressive phase errors of previous mention.

Accordingly, conventional time base correctors perform velocity correction by determining the phase error which occurs at each color burst by measuring discrete samples taken at the beginning of every horizontal line during the color burst, and then applying various techniques to try to anticipate or predict the phase shift which occur between the color bursts. It is necessary to predict the velocity errors between color bursts in order to provide continuous correction across the entire line of video. However, since the only discrete point along the scan line where the error can be accurately measured is during the color burst, there is no way of accurately determining the high frequency velocity errors which occur during the scan line.

Typically, there are several techniques for trying to predict the velocity error across an entire line of video while being able to measure the actual phase error only during the color bursts. A first technique involves what is known as first order correction, wherein the phase error is measured at the beginning and end of a line during the corresponding color bursts. First order correction then assumes that the error changes linearly across the entire line of video and provides a corresponding linear velocity error correction during the line scan. Such first order correction provides relatively valid correction during the video line if the velocity error changes are not high frequency, for example, are on the order of one kilohertz. Since the sampling rate is on the order of 15,750 Hz for an NTSC color television standard, a low frequency error is sampled at a sufficiently high rate that there are minor changes in slope in the velocity error across the line. Under such conditions, first order correction works fairly efficiently.

However, there are a range of velocity errors experienced during playback of a video signal which are of high to very high frequencies. Such velocity errors may be caused by scraping and internal friction of the rotating scanner mechanism, by scraping of the tape as it is pulled past the tape guides, and by impact errors caused when the various erase, record and reproduce heads strike the tape during the reproduce process. Such phenomena cause vibration in the tape which actually moves the tape back and forth across the reproduce head causing high frequency timing errors between the head and tape. The impact errors caused by a head striking the tape occur at some of the highest frequencies and exemplify high velocity errors which cannot be corrected by first order correction techniques.

Accordingly, a more sophisticated technique for compensating velocity errors involves second order correction, wherein the curvature of the phase error which occurs between bursts also is predicted. In such second order correction techniques, instead of looking at only the two bursts at the beginning and end of the line being corrected, three or more bursts encompassing the line being corrected are sampled to provide additional information which then is used to predict the curvature of the error with more accuracy. Sampling the velocity error at more than two bursts and performing arithmetic which predicts the direction and the extent of the curvature, provides an error correction signal which more efficiently reduces the high frequency velocity error along the middle of the line being corrected.

However, even with second order correction, very high frequency velocity errors such as those generated by the sudden impact of a head striking the tape, are not precisely corrected since there still is insufficient information available from even three or more bursts when the errors change rapidly during the interval of a scan line being corrected. That is, it has been found that more information which occurs in close spatial distance from the area being corrected is required in order to correct the higher frequency velocity errors. None of the first or second order techniques of previous mention, or any other higher order technique that simply uses more and more burst information, are able to provide the specific information required to enable precise correction of high frequency velocity errors occurring in the middle of a scan line. It follows that it would be highly desirable to provide some technique for generating information which more accurately defines the high frequency velocity errors which occur along the middle of a scan line, and for supplying the information in a manner to enable such velocity error correction. More particularly, it is highly desirable to provide a technique for enabling the precise compensation of very high frequency repetitive velocity errors known as impact errors caused when a rotating head strikes the tape during the reproduction process.

In addition, time base correctors presently in use provide velocity error correction for the full range of low to very high frequency errors, utilizing the common first and second order correction techniques of previous mention. However as discussed above, very high frequency impact velocity errors, for example, cannot be precisely corrected by techniques which are adequate for correcting low and high frequency random velocity errors. Typically, present velocity compensating techniques attempt to correct both repetitive and random velocity errors with a single configuration of the second order correction technique. However, since repetitive and random velocity errors have different characteristics, the common correction techniques provide at best only a compromised correction of each error. Accordingly, it also would be highly desirable to separate repetitive velocity errors from random velocity errors, whereby more accurate correction techniques tailored to each type of velocity error may be applied specifically to the respective velocity errors. More particularly, since the very high frequency impact velocity errors are particularly visible, it would be highly desirable to separate impact velocity errors from random velocity errors whereby the former may be corrected by a velocity compensation circuit optimized for impact error characteristics.

To illustrate the detrimental effects of the very high frequency impact errors, when re-recording multiple generations of a recording, random velocity errors build up gradually due to their random characteristic; that is, random errors increase approximately 1.4 times for each recording generation. However, repetitive velocity errors such as impact errors have the same time base error, that is, are coherent with vertical sync, and thus double in amplitude with each generation. It may be seen that the repetitive characteristic of impact velocity errors therefore can lead to undesirably large velocity errors which, in turn, cause very visible color hue disturbances in the video picture if not properly compensated.

Accordingly, the present invention overcomes the disadvantages of present compromise velocity error compensating techniques, by providing a method and apparatus for separating high frequency repetitive velocity errors, such as those caused by head impact, from random velocity errors, wherein both commonly are contained in a color video signal reproduced off-tape. The technique thus enables precisely treating the high frequency repetitive velocity errors separately, while also treating the random velocity errors, with velocity correction techniques particularly adapted to each type of error. More particularly, the invention provides for separating impact or repetitive velocity errors from random velocity errors by utilizing to advantage the periodic nature of the repetitive velocity errors, that is, the characteristic that the sampled repetitive errors are coherent with vertical sync of the video signal on a frame-by-frame basis. The combined velocity errors in each line of a frame of video are successively averaged together whereby, by their nature, random errors tend to cancel while repetitive errors are enhanced to make them readily available for separation.

To this end, measured velocity errors enter an averaging circuit at horizontal rate as a combined random and repetitive error signal, whereby the circuit maintains an error average for each line of a frame of video. The average is formed by a weighted sum of the error of a given line and the average for the given line over all previous frames. Thus velocity errors for respective lines from previous frames are averaged together. The number of frames in the average is related to a weighting constant K, with a value of $K=1/32$ being typical, to provide a continuous average over approximately thirty frames. Since repetitive errors such as impact errors, add together, while random errors average to zero over time, the output of the averaging circuit contains only the impact related errors. The repetitive velocity errors then are passed to an improved high order velocity compensating circuit which is optimized to handle such high frequency impact errors. In addition, the repetitive error signal is subtracted from the initial combined random and repetitive error signal to supply the purely random error signal, which then is supplied to a conventional first or second order velocity compensating circuit for correction. The outputs from the repetitive error and the random error compensating circuits then are summed to form a total combined velocity error correction signal. The latter signal is used, in the first type of time base corrector of previous mention, to adjust the clock of an A/D converter in the time base corrector which samples the off-tape video signal, to thereby compensate for offtape phase errors as further described below.

The invention further contemplates supplying curvature-predicting information of the high frequency repetitive velocity errors at not only the color bursts at the beginning and end of a horizontal line, but also at the middle of the line, whereby velocity errors which occur along the middle thereof may be more accurately predicted and thus corrected. To this end, the present technique exploits to advantage the characteristics of impact (and other repetitive) velocity errors, namely, that they not only are vertically synchronous but further that they interlace at frame rate. More particularly, averaged velocity error information from two interlaced fields are combined to generate error samples at the horizontal scan rate at the middle as well as the ends of a scan line which is being corrected. In effect, velocity error samples from one field are used to predict the velocity error of a line in another field. Thus errors which occur rapidly in the middle of a scan line are predicted with an accuracy not previously available, whereby the velocity errors may be corrected with corresponding accuracy.

More particularly, the averaged repetitive velocity errors in each line of a video signal are sampled at horizontal rate. Since the fields of a frame of video are interlaced and since repetitive errors are synchronous with vertical in each field, it follows that the same basic repetitive error profile occurs in both fields of a frame, and samples from a previous field interlace with respect to the samples from a present field, for adjacent lines of video. It follows that the curvature and extent of a repetitive velocity error in a line of the present field now may be more precisely predicted with data taken from the corresponding curvature of the repetitive velocity error in the adjacent line of the previous field. Thus, instead of taking prediction data from only successive color bursts of a horizontally extending series of lines in the same field of a frame, the invention contemplates obtaining the prediction data primarily from the most vertically adjacent bursts of the adjacent line in the previous field of the frame.

To this end, the repetitive velocity errors which are provided by the averaging circuit of previous mention are supplied at horizontal rate to a 1-field delay and to a frequency accumulator circuit. The repetitive velocity error signal is composed of information from a present field, for example, field 2 of a frame, and represents the frequency change that must be added to the present sampling clock oscillator frequency to match it to the off-tape frequency. The frequency accumulator circuit provides at its input a first order error correction signal from two bursts of the present field 2, which error correction signal comprises the present frequency control signal fed to the clock oscillator and which stays constant over each scan line. The delayed signal from the 1-field delay is derived from burst information taken from a previous field, for example, field 1 of the frame. The delayed signal from the 1-field delay is multiplied by a constant in order to convert velocity error in degrees of subcarrier phase to frequency error in Hertz, and the resulting signal then is integrated to generate a horizontal rate ramp with a frequency slope value related to the curvature of the velocity error. The ramp signal is added to the present clock oscillator frequency supplied by the frequency accumulator circuit, to supply the total repetitive frequency control signal. The latter signal then is summed with the frequency control signal generated by the random velocity compensating circuit of previous description to provide a combined frequency control signal whose frequency changes linearly along the line to compensate for corresponding velocity errors in the off-tape signal.

In situations where repetitive velocity errors may be the primary errors of concern, the invention contemplates the separation of the repetitive errors via the frame averaging technique and the subsequent generation of the repetitive velocity error compensating signal via the error interlace technique, to perform repetitive velocity error compensation on the reproduced signal. Conversely, the invention contemplates subtracting the repetitive velocity errors derived via the frame averaging technique to supply the purely random velocity errors, with the subsequent generation of the random velocity error compensating signal to perform random velocity error compensation on the signal. Still further, the variously generated random and/or repetitive velocity error compensating signals may be applied to the A/D converter to correct velocity errors in the off-tape signal prior to the time base corrector, or may be applied to the D/A converter to correct velocity errors on the reference clock side of the time base corrector, depending upon the type of time base corrector in which the invention is being used.

Although the invention is described in arrangements for correcting velocity errors that occur in color television signals reproduced from a magnetic medium, the invention is useful for correcting comparable time base errors in other information signals containing a time base reference signal component that permits the time base of the information signal to be measured periodically.

The invention technique herein is implemented in a digital hardware/software configuration by way of example only, but may be implemented as well in digital hardware only, or in an analog/digital hybrid configuration, as is readily apparent from the description hereinafter.

BRIEF DESCRIPTION OF THE DRAWINGS

FIGS. 1A-1J are a graph of waveforms illustrating repetitive and random errors contained in a video signal and their relationship with the horizontal and vertical sync signals over fields 1 and 2 of a selected succession of frames.

FIG. 2 is a block diagram depicting the method and apparatus of the invention within a selected time base corrector environment.

FIGS. 3A-3E are a graph of waveforms illustrating a comparison of conventional compensation provided for a high frequency repetitive velocity error using presently known first and second order correction techniques.

FIGS. 4A-4G are a graph of waveforms illustrating the present error interlace technique used in the repetitive velocity compensating circuit of FIG. 2, for correcting the high frequency repetitive velocity error depicted in FIG. 3.

FIGS. 5A-5B are a graph illustrating a more accurate comparison of the results of the second order correction technique versus the present error interlace compensation technique, when correcting the repetitive velocity error shown in FIGS. 3 and 4.

FIGS. 6A-6E are a graph of the information depicted by the waveforms of FIGS. 4 and 5 but showing consecutive horizontal lines of successive fields to further illustrate the spatial selection of interlaced error samples from two fields.

FIG. 7A is a block diagram depicting a functional implementation of the repetitive velocity compensating circuit of FIG. 2.

FIG. 7B is a block diagram depicting an implementation of the repetitive and random velocity compensating circuits of FIGS. 2 and 7A.

FIG. 8 is a block diagram depicting an implementation, in digital hardware, of the method and apparatus of FIGS. 2 and 7A, 7B in part.

FIGS. 9, 10, 11 and 12 are flow charts depicting the combined routines, the frame averaging, the random error separating and the RAM address incrementing routines of the apparatus of FIG. 8, and FIG. 13 is a flow chart of the repetitive error compensating routine of the apparatus of FIGS. 8 and 15.

FIG. 14 is a block diagram of an alternate time base corrector environment wherein the present method and apparatus readily is applicable to correct velocity errors.

FIG. 15 is a block diagram exemplifying an implementation of a digital clock oscillator circuit used in the systems of FIGS. 2 and 14.

DESCRIPTION OF THE PREFERRED EMBODIMENTS

As previously discussed above, velocity errors may be defined in terms of frequency spectrum, and range from low frequencies through very high frequencies. Velocity errors also may be categorized as random and repetitive velocity errors. Random errors may include errors of from low through very high frequencies, while repetitive errors such as head impact errors, are generally of very high frequency. Since the two types of velocity errors differ in their characteristics, present velocity error compensation circuits which correct both types of errors together, provide at best only a compromised correction of the errors. As mentioned above, it would be preferable to separate the repetitive and the non-repetitive (random) velocity errors, whereby each type of error may be treated separately utilizing a correction circuit adapted to handle the respective type of velocity error. To simplify the description herein, the terms "random" and "impact" are generally used herein by way of example only, to define non-repetitive and repetitive velocity errors, respectively.

To this end, the present invention utilizes the fact that although repetitive errors are generally of very high frequency, they do repeat at a specific rate related to the video signal. More particularly, repetitive velocity errors repeat at the vertical rate and, specifically, an impact velocity error caused by a head striking the tape repeats once each television field. The invention utilizes such characteristic to provide separation of the impact velocity errors into a first electronic channel, with the random velocity errors being provided in a second electronic channel. Thus each type of velocity error is individually available and is treated separately utilizing a respective correction circuit adapted to provide optimum correction of the respective type of error as described below.

By way of illustration, FIG. 1 depicts a frame of video signal formed of field 1 and field 2 in, by way of example, an NTSC color television standard. The concepts also are readily applicable to other standards, such as PAL, SECAM and high definition television standards, wherein repetitive velocity errors are coherent with vertical sync of the video signal. Off-tape horizontal (H) sync signals 13 for each line of a field are depicted in FIGURE 1A, while associated off-tape vertical (V) sync signals 15 are depicted in FIG. 1B. FIG. 1C illustrtes by way of example only, typical velocity errors contained in a reproduced video signal from tape, (the video signals themselves are not shown) and includes exempliary impact and random velocity errors. By way of example, the repetitive errors herein depicted are impact errors caused by head contact with the tape in a type "C" video recorder, wherein the erase, record and playback head impact errors are depicted at numerals 12, 14, 16 respectively in field 1, and again as numerals 18, 20 and 22 respectively in field 2. Since the heads are circumferentially equally spaced apart at 120° on a helical scanning drum, the impact errors are equally spaced along a field scan. Although the random velocity errors herein are depicted as noise superimposed on the impact errors as well as on the base line of the video signals (not shown) for illustrative purposes only, it is to be understood that random velocity errors range from high frequencies through the relatively low frequencies which herein are represented by the envelopes of the noise waveforms in FIG. 1. Since the heads strike the tape once each field the resulting impact errors are synchronous with the vertical sync signals as shown in FIG. 1C. However, the errors are sampled with respect to horizontal sync which, in the NTSC, PAL, etc., color television standards, is not coherent with vertical on both fields whereby the error samples are not coherent with vertical sync. Therefore, the technique preferably employs averaging over frames to readily enhance the horizontally sampled repetitive errors while cancelling the random errors.

To illustrate further, the first impact velocity errors 12 and 18 (as well as the random velocity errors) for the first and second fields respectively, are expanded in FIG. 1D, and vertical sync 24, 26 and horizontal sync 28, 30 of fields 1 and 2 of consecutive lines of video are depicted in corresponding expanded scale in FIGS. 1E, 1F. Typical video information signals 29 and 31 also are illustrated in some of the scan lines of FIG. 1F. It is noted that the curves and pulses of the various signals are drawn out of proportion for purposes of illustration only. It may be seen that impact velocity errors 12 and 18 of respective fields 1 and 2 are coherent with the vertical sync pulses 24, 26 respectively, but each are not coherent or synchronous with the horizontal sync signals 28, 30 of both fields 1 and 2. Due to the nature of the interlaced fields, the H sync signals 30 are displaced from the V sync signal 26 by one-half of a horizontal line length as depicted in FIG. 1F, field 2. Thus to insure that the repetitive errors of the video signal are added while the random errors are effectively filtered from the video signal, the errors are averaged over a frame-by-frame relationship where they are in effect coherent with horizontal and vertical sync.

The velocity errors such as shown in FIG. 1D, are sampled and then averaged at frame rate for each line of successive frames. The average for each line of the successive frames is formed by taking a weighted sum of the error of a line and the accumulated average for the same line from the previous frames. Thus the successive velocity errors of each line of a selected plurality of frames are averaged together, wherein the number of frames in the average is related to a weighting constant K, with the value of K=1/32 being typical and used herein by way of example to average approximately 30 frames. Obviously, the number of frames averaged together may vary, for example, from 4 to 60 or more frames depending upon the relative amounts of random and repetitive errors present. Because of the repetitive nature of the impact velocity errors 12-22, the accumulated average essentially contains only the impact related errors since the random errors will average to near zero over time. To illustrate, FIG. 1G depicts the impact and random velocity errors for a frame 2, wherein repetitive impact velocity errors 12a, 18a are coherent with the vertical sync signals 24, 26 and thus are coherent with the frame 1 impact velocity errors 12, 18 respectively, of FIG. 1D. The superimposed random errors obviously are not synchronously repetitive. Likewise, FIG. 1H depicts the impact velocity errors (indicated by numerals 12b, 18b) and superimposed random velocity errors for successively averaged frames 3 through 30, wherein the impact errors again are synchronous with vertical sync on a frame-by-frame basis.

FIG. 1I depicts by way of example the resulting averaged impact velocity error 12c of field 1 and the resulting averaged impact velocity error 18c of field 2 as processed by the present frame averaging technique.

FIG. 1J depicts the random error signal provided by a repetitive error subtraction process, further described below, which random errors then are handled by conventional velocity compensating circuitry. It may be seen, that the random velocity errors have been separated from the averaged impact velocity errors as depicted by the waveforms of FIGS. 1I, 1J. Thus as further described in FIG. 2, the enhanced repetitive errors readily are available for direction to an electronics channel for error compensation by specific correction techniques, and the random velocity errors are available for direction to a separate electronic channel where they may be handled by conventional first or second order velocity correction techniques. The subsequent velocity error signals of the two channels then are summed to form a combined velocity error signal which is used to drive to zero any phase error which exists between the sampling clock phase and the off-tape color burst zero degree crossings in the time base corrector configuration of FIG. 2, or to compensate for phase errors at the D/A converter of the time base corrector configuration of FIG. 14, as described further below.

To this end, FIG. 2 illustrates in block diagram the hardware and related functions contemplated in the method and apparatus of the invention. An analog color video signal is reproduced from tape and supplied to a delay circuit 35 having a delay of one horizontal line plus 3.5 microseconds, and thence to a contact of a suitable switch 33. The switch 33 is then coupled to a conventional analog-to-digital (A/D) converter 34. The off-tape video also is coupled to a second contact of the switch 33, and thus can be coupled directly to the A/D converter 34. The switch 33 and the delay 35 allows access to the bursts at either end of a scan line, so that correction can be made across that line. Thus, the switch 33 normally is in the delayed video position but is switched to an early burst (EB) position during off-tape video burst time via an early burst gate on a line 37. It may be seen that the switch 33 provides an A/D video signal which includes delayed active video, a delayed (late) burst (LB) and an early burst from current input video. The A/D video signal is sampled at a rate determined by an A/D clock supplied via a clock line 36, and the sampled video signal data are supplied to the memory of a time base corrector 41 via a bus 39 for subsequent time base processing to remove the usual time base errors which exist in the off-tape signals relative to a stable reference clock, in conventional fashion. The time base corrector memory 41 is loaded via an off-tape related write signal corresponding to the A/D sampling clock on the line 36. The sampled video data signal is the signal whose phase error has been corrected as it is sampled by action of the invention. The output of the time base corrector 41 is supplied to a digital-to-analog (D/A) converter 45 in response to a reference related read signal provided by a reference clock generator 49 and the D/A converter is clocked by the reference clock, in generally conventional fashion.

The sampled color burst data alone is passed to a burst filter circuit 38 in response to early burst and late burst gate signals on a line 43 thereto, and circuit 38 bandpass filters the digitized bursts to suppress tape induced video noise which would degrade the phase error measurement. To this end, the circuit 38 applies a given coeffcient to each sample and then averages similar odd and even samples in each cycle of burst subcarrier. The resulting two filtered samples are 90° apart and are used to develop an error signal that represents the phase error, in degrees, between the A/D sampling clock (4Fsc) and the burst zero crossings, and which is indicative of velocity errors in the reproduced video signal.

The burst filter circuit 38 is coupled to a burst phase detector means 40 which calculates the phase error between the A/D sampling clock and the burst zero degree crossings reflected in the positions of the two filtered samples. Since the burst phase detector means 40 measures the phase error between the off-tape bursts and the A/D clock, and since the clock is being continuously updated, that is, phase shifted to correct velocity errors over a scan line interval, the measurements are not absolute values of phase error but are instead differential phase error values referenced to the clock phase. The detected phase errors of the successive early bursts are supplied to a register 42 and to the positive input of a subtracting means 46. The register 42 provides a delay equal to one sample period, whereby the subtracting means 46 subtracts the previous line phase error from the present line phase error, to provide the phase shift (related to frequency) of the off-tape video burst relative to the sampling A/D clock across a scan line. The phase shift is directly indicative of the frequency error between the off-tape subcarrier and the A/D sampling clock. By way of example, apparatus which includes the components 34 through 46 in FIG. 2 and which provides an exemplary measured velocity error signal on a bus 47, may be found in the service manual, Catalog No. 1809690, October, 1985, for the ZEUS 1 Advanced Video Processor manufactured by Ampex Corporation, Redwood City, Calif., wherein ZEUS is a trademark of Ampex Corporation.

The output of the subtracting means 46 is the measured velocity error signal such as depicted in FIGS. 1C, 1D, and is supplied via the bus 47 to a frame averaging circuit 48 of the invention, which forms a portion of a repetitive error channel 50. The velocity error signal includes both the random and the impact velocity errors of previous mention. The combined velocity error signal is supplied to a multiplying means 56 of the frame averaging circuit 48 as well as to a subtracting means 52 of a random error channel 54. The frame averaging circuit 48 reinforces the impact velocity error components while simultaneously cancelling random velocity error components such as those due to video noise or non-repetitive mechanical disturbances commonly associated with the reproduce process.

In the present technique, the measured velocity error signal generated by the subtracting means 46 is represented by a digital sample taken every horizontal line, that is, every color burst, and as shown at the top of FIG. 1, comprises 525 individual velocity error samples in one frame of a video signal in a NTSC color television standard system. In a PAL standard system there would be 625 samples per frame. In order to average the errors in a second frame with those of a previous frame, samples 1 of each frame are added together, then samples 2 of each frame are added together, and so on through all 525 samples. The sums then provide the average of the first and second frame's velocity errors. The respective samples of the third frame next are added to the averaged samples of the first and second frames, to provide the new average of the errors in all three frames, and the old averaged values of the first and second frames are discarded. The running averaging sequence continues whereby storage is required for only the 525 samples.

In order to minimize the effect of the noise in incoming (raw) samples of a frame relative to the previous averages, the invention contemplates weighting the values of the incoming samples via a constant to provide a filtering effect on existing noise. To this end, a small fraction, namely 1/32, herein is multiplied times the incoming sample, and the result is added to 31/32 of the previous average of the sample, and so on through all 525 samples of the 30 frames averaged together. Thus the repetitive velocity error values build up gradually while the random velocity errors are filtered out. As a result, the samples are averaged over the full 30 frames before the impact velocity errors build up to full amplitude. In effect, the frame averaging technique of the invention resembles a comb filter in that it enhances signals which repeat at frame rate while tending to cancel signals which are random, or repeat at different rates.

The multipling means 56 herein, by way of example only, has the multiplication value of $K=1/32$ mentioned above, which value readily is achieved in digital hardware by shifting bits. The resulting weighted value is supplied to a summing means 58 and thence to a frame delay means 60, which herein comprises a random access memory (RAM) having a capacity of at least a full frame of 525 samples in the NTSC color television standard, or 625 samples in the PAL standard. In a practical implementation, the RAM stores the frame of data as two successive fields of data, whereby each field of data is readily available for concurrent use by the repetitive error interlace correction technique further described below relative to FIGS. 7A,7B. The frame delay means 60 stores the set of successively averaged values of the 525 samples, over the succession of approximately 30 frames. The output of the frame delay means 60 is coupled back to the summing means 58 via a multipling means 62 which performs the function of multiplying the frame delay output by 1-K weighting constant which, in the example herein is 31/32 and complements the fraction 1/32 employed by the multipling means 56. The successively averaged accumulation supplied by the frame delay means 60 is supplied via a bus 64 to a repetitive velocity compensating circuit 66 of the repetitive error channel 50, as well as to a negative input of the subtracting means 52 of previous mention in the random error channel 54. The repetitive velocity compensating circuit 66 in turn is adapted to compensate for the high frequency impact velocity errors separated by the frame averaging circuit 48 (FIG. 1I) and provides a resulting frequency control signal indicative of the repetitive velocity errors to a summing means 70 via a bus 68.

The repetitive velocity error signal of bus 64 further is subtracted from the measured combined (random and impact) velocity error signal supplied on the bus 47, via the subtracting means 52, whereby the latter supplies the random velocity error signal (FIG. 1J) to a random velocity compensating circuit 74 via a bus 72. The latter circuit 74 may comprise a generally conventional first or second order correction circuit adapted to correct random velocity errors, which supplies a frequency control signal indicative of the random velocity errors on a bus 76. The random and repetitive frequency control signals on buses 68, 76 respectively, are added as depicted by the summing means 70 to provide a combined frequency control signal on a bus 78. The latter signal provides velocity compensation for velocity errors in the video signal being reproduced from the tape by controlling the frequency of the A/D clock. Although the velocity compensating circuits 66 and 74 are depicted separately, in a practical implementation, given components within the circuits are shared as further described in FIGS. 7A,7B.

The frequency control signal on bus 78 is supplied to a clock oscillator circuit 80 for generating a compensated sampling clock on the line 36 having a frequency of, for example, 4Fsc, which is continuously adjusted to compensate for velocity errors in response to the frequency control signal on the bus 78. FIG. 15 illustrates an implementation of a known digital clock oscillator circuit 80, such as used for example in the ZEUS 1 apparatus of previous mention, and which is further described in the service manual. Circuit 80 includes math processor means 81 formed of a K multiplier 82 and an H register 84, both coupled to a summing means 86. The latter is coupled to a register bank 88, which is coupled back to the bus 78 and also to frequency synthesizer means 90 which, in essence, is a digitally controlled clock oscillator. The frequency synthesizer means 90 is formed of a phase accumulator 92, a sine function PROM 94, a D/A converter 96, a low pass filter 98 and a times-4 phase lock loop 100.

In operation, the clock oscillator circuit 80 generates a times-4 subcarrier A/D sampling clock of 4Fsc. The math processor means 81 receives the frequency error information via the bus 78 and converts it to the actual frequency control word which is sent to the frequency synthesizer means 90 to control the latter. More particularly, the math processor means 81 takes frequency error values and uses them to set the frequency synthesizer means 90 to its new frequency. The error values are multipled by a constant K selected by a respective K control input, wherein the different multiplier constants are predetermined and stored in the PROMS of the K multiplier 82 and are the constants K and Kl depicted in the FIGS. 7A,7B. The products of the multiplication are loaded into the H register 84 for temporary storage. The summing means 86 adds the number stored in the H register 84 to the new number supplied by the K multiplier 82 and the sum is stored in one of several registers in the register bank 88. The frequency synthesizer means 90 is the digital equivalent of a voltage controlled oscillator, wherein a register of the phase accumulator 92 thereof contains a binary word representative of the present phase of the synthesizer. The frequency control word is continuously added to the old phase value and the sum is stored in the phase accumulator as a new phase. When the resulting phase ramp approaches maximum, the phase accumulator overflows, resetting the ramp to near zero and the process repeats. Thus larger frequency control word values give a larger phase increment per clock, yielding a steeper ramp which passes through 360° of phase faster to provide a proportionately higher phase frequency. By way of example, the frequency ranges herein from zero to approximately 10 Mhz. The 360° phase ramp from the phase accumulator 92 is converted to a digitally sampled sine wave using the sine function PROM 94 to generate one sine wave cycle for 360° of phase. The resulting sine wave samples are supplied to the D/A converter 96 and the resulting analog signal is a series of voltage steps at the control clock rate representing the sine wave. The phase accumulator 92 and the D/A converter 96 are controlled by a crystal oscillator. The step sine wave is filtered and then supplied to the times-4 phase lock loop 100 wherein it is multiplied to provide the compensated sampling clock of 4Fsc used by the A/D converter 34 to digitize the off-tape video. In the time base corrector configuration of FIG. 14 described below, the compensated clock is used to clock the D/A converter 45 instead.

In accordance with the invention, the repetitive velocity compensating circuit 66 of FIG. 2 provides improved compensation for the separated high frequency impact velocity errors by exploiting the fact that repetitive velocity errors are vertically synchronous and interlace at frame rate. This allows the present error interlace technique to predict the curvature of high frequency velocity errors which occur in the middle of a given line with information taken from a burst in a line of a previous field, which burst occurs at the middle of the given line. To illustrate the advantages of the present interlace scheme, FIG. 3 depicts first and second order velocity compensation as practiced in present conventional time base correctors, wherein integral velocity compensators sample phase errors at the beginning and ends of horizontal lines during the color burst interval only. By way of definition, velocity errors are the phase shifts which occur across a scan line with respect to a reference clock. FIG. 3A depicts the vertical (V) sync signal 112, while FIGS. 3B and 3C depict the corresponding horizontal (H) sync signals 114, 116 and respective color bursts 118, 120 for field 1 and field 2 respectively, of a frame of video information in a NTSC color television standard system. FIGS. 3D, 3E each depict an averaged impact velocity error 122 without random velocity error such as that of FIG. 1I, caused by a head striking a tape. In a first order velocity compensation technique, wherein a selected horizontal line 124 (FIG. 3C) of field 2 is being corrected, the phase error is sampled at the bursts 120 corresponding to hhe beginning and end of the line to provide the respective samples SE1 and SE2 (FIG. 3D). As known, first order velocity compensation approximates the phase error across the line as a straight line 126 between the samples SE1, SE2 which, given the depicted high frequency error 122, results in a substantial residual error 128 between the approximated correction value and the actual error.

The second order velocity compensation technique is depicted in FIG. 3E wherein the scan line 124 is corrected by sampling the error at three bursts 120 of field 2 to provide samples SE$\emptyset$, SE1 and SE2. Thus information from the line preceding line 124 also is used to predict the curvature of the phase error across the line and to supply a correction curvature in the form of a parabola 130. The resulting correction provides less residual error than the first order technique, as depicted at 132, but still allows considerable color hue disturbance in the resulting corrected television picture. As may be seen, the samples available for estimating the error are taken from horizontal lines in the same field and thus are spatially distant from the actual error in the middle of line 124.

FIG. 4 depicts the present error interlace technique which employs the second (or higher) order velocity compensation techniques of previous description, but which further exploits the vertically synchronous characteristic of the impact velocity errors, combined with the interlaced field characteristics of the various color television standards. More particularly, the present invention employs a second (or higher) order velocity compensation process using error information from one field, to more precisely estimate the error curvature of a line in a different field, whereby the information is spatially much closer and therefore is correspondingly more accurate. To this end, FIGS. 4A, 4B depict the H sync signals 114, 116 and the corresponding color bursts 118, 120 of successive horizontal lines of fields 1 and 2 respectively, as previously depicted in FIGS. 3B, 3C. The high frequency repetitive velocity error 122 is depicted in FIG. 4C, which further depicts samples taken at respective bursts 118 in field 1 as SO1, SO2, SO3 and SO4, and at respective bursts 120 in field 2 as SE$\emptyset$, SE1, SE2 and SE3. Now when correcting velocity error in, for example, the line 124 of field 2, the present technique employs first order velocity compensation to provide a straight line error between corresponding samples SE1 and SE2, but further employs second order velocity compensation using the samples SO1, SO2 and SO3 from field 1 to predict the curvature of the error in line 124 in field 2. Since sample SO2 lies in the middle of the line 124, a much more precise prediction of the error may be made. It follows that the residual error 134 is substantially reduced compared to the residual errors 128 or 132 of the prior compensation techniques depicted in FIGS. 3D, 3E. A comparison of the residual errors of the second order correction technique and the present error interlace technique, is more accurately shown in greater detail in FIGS. 5A, 5B discussed further below, wherein correction of the impact error 122 is compared over three successive scan lines.

FIG. 4D shows the velocity error in terms of frequency difference, $\Delta F$, for three successive lines 136, 124 and 138 of field 2 obtained from samples SE$\emptyset$,SE1, SE1,SE2 and SE2,SE3, respectively. The waveform of line 136 is obtained from the relationship $\Delta FE\emptyset = K \cdot (SE1 - 2SE\emptyset + \emptyset)$; line 124 from $\Delta FE1 = K(SE2 - 2SE1 + SE\emptyset)$; and line 138 from $\Delta FE2 = K (SE3 - 2SE2 + SE1)$, where K herein is a constant equal to 15,735/360°, and provides translation of phase errors to frequency errors. FIG. 4E shows the waveforms for the first order correction of the velocity errors where the line 136 is obtained from the relationship $\Delta FE\emptyset + \emptyset$; line 124 from $\Delta FE\emptyset + \Delta FE1$; and line 138 from $\Delta FE\emptyset + \Delta FE1 + \Delta FE2$. The FIG. 4F waveforms show the predicted frequency slope provided by second order compensation of samples SO$\emptyset$, SO1, and S02 of field 1 used to predict the curvature for the line 136 in field 2. Samples SO1, SO2 and SO3 of field 1 are used to predict the curvature of the error in the line 124 as previously described, and samples SO2, SO3 and SO4 of field 1 are used to predict the curvature of the error in the line 138 of field 2, and so on for each following line. The slopes of the frequency signals in FIG. 4F are determined by taking the integral of the velocity error, $\Delta F$ derived from field 1, samples SO1, SO2, SO3, SO4 in the same fashion as FIG. 4D is derived from samples SE$\emptyset$, SE1, SE2, SE3. This is indicative of the curvature of the phase error across each field 2 line. FIG. 4G depicts the summation of the first and second order compensation processes shown in FIGS. 4E and 4F, respectively, for each line 136, 124, 138 of field 2; ergo, is the modification made to the straight line information taken from field 2 using the curvature-predicting information taken from field 1. The waveform represents the frequency control signal which changes linearly across each line being corrected and which is made to closely approximate the frequency of the off-tape subcarrier.

FIG. 5A is a more accurately calculated waveform of the second order correction shown in FIG. 3E, while FIG. 5B is a correspondingly calculated waveform of the waveform generated by the error interlace correction technique of the invention. The dashed line depicts the impact velocity error 122 in the video signal and the solid line depicts the correction waveform, for the scan lines 136, 124 and 138 of previous mention. In FIG. 5A, curves 140, 141 and 142 show the correction curves for lines 136, 124 and 138 respectively of the conventional second order correction technique, with residual errors 143, 132 and 144 in the respective lines. In FIG. 5B, curves 145, 146 and 147 depict the correction curves of the invention for the lines 136, 124 and 138 respectively, wherein the residual errors 148, 134 and 149 for the lines are substantially less than the corresponding residual errors in FIG. 5A. The correction by the invention in practice is better than shown in FIG. 5B, particularly in line 136, where the error 122 is depicted as an exaggerated curve starting from zero. In actual practice, there would be curvature in the error of the line preceding line 136 which would provide curvature prediction data other than zero and would reduce the residual error 148 considerably.

FIG. 6 further illustrates the present interlaced sampling technique wherein several successive lines 150-156 of field 1, frame 1 are depicted with respective color bursts 158-164 (FIG. 6B) and several adjacent lines 166-172 of field 2, frame 1 include respective color bursts 174-180 (FIG. 6C). In addition, lines 182, 184 and respective bursts 186, 188 of field 1, frame 2, (FIG. 6D) and a line 190 and burst 192 of field 2, frame 2, (FIG. 6E) also are depicted, to illustrate the interlace at half-line intervals of the bursts. Thus error prediction information from one field may be obtained from spatially close bursts of the previous field of successive frames. Using the same notations as in FIGS. 4 and 5, when correcting a velocity error in, for example, the line 168 of field 2, frame 1, first order information is provided from burst samples SE1, SE2, and second order information is supplied from burst samples SO1, SO2 and SO3 of field 1, frame 1. The present error interlace technique further contemplates higher order correction by employing samples from five bursts, namely, SO∅ through SO4 of the adjacent field 1, frame 1, and/or use of the additional bursts, SE∅ and SE3 of field 2, frame 1, as depicted by the additional dashed lines. When errors are corrected in field 1, frame 2, the curvature-predicting information is taken from samples SE∅ through SE3, etc., of field 2, frame 1, and so on down through the successive interlaced fields of video.

FIG. 7A depicts a functional implementation of the method and apparatus of the repetitive velocity compensating circuit 66 of FIG. 2, which employs the interlaced error samples from a previous field to predict the velocity error in the line of a present field, as depicted in FIGS. 3-6. Similar components are similarly numbered in the FIGURES. The averaged repetitive velocity error signal generated by the frame averager circuit 48 is supplied on the bus 64 to two channels of the compensating circuit 66, namely, a first order channel 206 and a higher order channel 208. In the first order channel 206, the repetitive velocity error signal is supplied at horizontal rate to a multiplying means 209 having a scaling constant K1=15,735/360°, and thence to a frequency accumulator means 210 formed of an adder means 212 and a register 214. The latter has a H-clock input as depicted by a line 213. The frequency accumulator means 210 performs the first order correction of previous mention, namely generating a differential digital value corresponding to the present clock frequency which stays constant over each scan line and which is derived by subtracting a burst sample of one line from the burst sample of the previous line. The output of the frequency accumulator means 210 is the frequency control signal which matches the off-tape subcarrier frequency, depicted in FIG. 4E and is supplied to a summing means 216.

The averaged repetitive velocity error signal also is supplied to a field delay means 218 in the higher order channel 208, which comprises in this example, a random access memory (RAM) with enough storage for a field of samples. The field-delayed signal is supplied to a multipling means 220 having a constant of, for example, K=½, which converts velocity error across a line in values of degrees to a desired frequency slope in Hertz/unit time. The value of K can be changed to effect better high frequency compensation at the expense of low frequency compensation. K=½ has been found to be optimum for type-C velocity errors. The resulting signal is applied as in the waveform of FIG. 4D, to a multiplying means 221 having a scaling constant K1=15,735/360°, and thence to an integrator means 222. The means 222 comprises in essence a digital accumulator formed of a register whose output is fed back to an adder to herein generate a rapidly stepped ramp in response to a high speed clock of the order of 2.5 MHz. The integrator is reset at horizontal rate as depicted by an input 224. The integrator means 222 generates the rapidly stepped ramp with a slope related to the curvature of the repetitive velocity error derived from the field delay means 218, and which corresponds to the signal depicted in FIG. 4F. The resulting integrated signal is supplied to the summing means 216, and is added to the first order signal from the frequency accumulator means 210 (FIG. 4E) to provide the total frequency control signal indicative of impact error such as depicted in FIG. 4G. This latter signal is supplied on the bus 68 which is coupled to the summing means 70 of FIG. 2.

As previously mentioned, in a practical implementation the compensating circuits 66 and 74 actually share various components depicted in FIG. 7A. To illustrate, FIG. 7B depicts a further implementation of the compensating circuits wherein the frequency accumulator means 210 and the integrator means 222 of FIG. 7A are shared to process the repetitive and random velocity error components supplied via the buses 64, 72, respectively. The averaged delayed repetitive error component from field delay 218 is supplied to a summing means 226 via the multiplying means 220 (K=½) and thence to a multiplying means 228 having a scaling factor of K=15,735/360°. The latter multiplier translates the error across a line from phase error in degrees to frequency error in Hertz, whereby the signal is integrated via integrator means 222. The random errors of bus 72 also are processed via the multiplying means 221 and integrator means 222 via a multiplying means 230 (with K=½) and the summing means 226. Similarly, the repetitive and random error components are supplied to a summing means 232 and thence to the frequency accumulator means 210 via the multiplying means 209 with K=15,735/360° which translates the signal to frequency. The processes of the summing means 212 and 216 of FIGS. 7A, 7B are in effect performed by the summing means of FIG. 15. In the implementation herein, the function of the field delay 218 is provided via the RAM 302, and the multiplying means 220, 230 and summing means 226, 232 are performed in the K multiplier means 281 and ALU 290, respectively, in FIG. 8. The remaining functions of the multiplying, summing, integrating and accumulator means are provided via the circuitry of FIG. 15 in the course of also generating the clock via the clock oscillator circuit 80, wherein the functions of the components of FIGS. 7A,7B are further evident from the flow charts of FIGS. 9-13. In addition, the field delay 218 is formed of one of the two field configuration of previous mention for the frame store of the RAM 302, such as depicted as the frame delay 60 of FIG. 2, whereby present field data are supplied via one field store while the previous field data are supplied by the other field store.

It may be seen that if the field delay 218 is omitted from the repetitive error compensating circuit 66 of FIG. 7A, the remaining components exemplify in effect a second order compensator arrangement which may be used as the random velocity compensating circuit 74 of FIG. 2. In such a circuit, consecutive burst phase errors from successive lines of the same field are used to perform second order correction, as previously described above.

The invention has been described relative to the block diagrams of FIGS. 2 and 7A,7B in terms of discrete hardware functions, as performed by corresponding digital hardware. The functions depicted in FIGS. 2 and 7A,7B are herein implemented via selected memory, register, arithmetic logic unit (ALU), programmable memory (PROM) and multiplier components found in the overall time base corrector of previous mention. Referring thus to FIG. 8, there is depicted a block diagram of the hardware corresponding to the components of FIG. 2 and the field delay means 218 of FIGS. 7A,7B. FIG. 15 depicts the hardware corresponding to the components of FIGS. 7A,7B. In addition, the flow charts of FIGS. 9, 10, 11 and 12 depict the various routines followed by the hardware of FIG. 8, and the flow chart of FIG. 13 depicts those of FIG. 15, in accordance with the invention. Similar components and/or corresponding functions are identified in the FIGS. 2, 7A,7B, 8 and 15 by similar numerals. Thus, the measured velocity error signal is supplied via the bus 47 to a data bus 280, and thence to K multiplier means 281 formed of selected programmable read only memories (PROMS) 282, summing means 284 and buffer 286. The K multiplier means 281 performs the multiplication processes depicted by multiplying means 56 and 62 of FIG. 2, as well as by multiplying means 220, 230 of FIGS. 7A, 7B. (Likewise multiplication processes of multiplying means 221 and 209 of FIGS. 7A,7B are performed by the K multiplier 82 of FIG. 15). A bypass buffer 288, FIG. 8, provides a path for bypassing the data on data bus 280 around the K multiplier means 281. An arithmetic logic unit (ALU) 290 and a H register 292 are coupled to the K multiplier means 281 output, as well as to the bypass path, and perform the arithmetic functions corresponding to the summing means 58 and 70, and the subtracting means 46 and 52, of FIG. 2. The ALU 290 also performs the arithmetic functions corresponding to the summing means 226 and 232 of FIG. 7B. The ALU 290 output is coupled via a limiter/modulus change circuit 294 and a corresponding ALU bus, to an AC register 296 which couples the ALU 290 output directly to the data bus 280, to a write (W) register 298 and to an output register 300. The W register 298 is coupled to a RAM 302 and a read (R) register 304 via the usual data bus, and the latter in turn is coupled to the data bus 280 extending back to the input of the K multiplier means 281. The AC register 296 provides means for bypassing the RAM 302. The output register 300 supplies a combined velocity error value in degrees, which signal corresponds to the two outputs of the summing means 226 and 232 of FIG. 7B.

The frame averaging, random error separating, associated RAM incrementing processing and repetitive error correction measurement functions are performed in practice by the components of FIGS. 8 and 15 as depicted in FIGS. 2 and 7A,7B, and as set forth in the routines of the flow charts of FIGS. 9, 10, 11, 12 and 13. The various control, address and data signals associated with the multiplying, arithmetic and write/read RAM operations are described in the ZEUS 1 service manual of previous mention, and are not detailed herein to simplify the description. Obviously, the functions depicted by the components of FIGS. 2, 7A,7B may be implemented by discrete digital hardware or in an analog/digital hybrid hardware configuration, if desired.

The combined routines of FIGS. 10, 11 and 12 are shown in the flow chart of FIG. 9. At such time as burst is received via the bus 47, the averaging routine of FIG. 10 is initiated, followed in turn by the repetitive error subtraction and the RAM incrementing routines. The system then waits for the next burst to arrive before again initiating the cycle of routines for the next sample.

Referring also to FIG. 8, the frame averaging routine is depicted in FIG. 10 wherein, in a continuing sequence, an averaged velocity error which was previously stored in RAM 302 address N is read therefrom into the R register 304. The K multiplier 282 is set to K=31/32 via the K-select input, and the averaged velocity error in the R register 304 is enabled onto the data bus 280 and is multiplied by the coefficient K. The product is clocked into the H register 292. The measured, combined velocity error taken from a present burst which previously had been stored in RAM 302, is read therefrom into the R register 304. The K multiplier 282 now is set to K=1/32 via the K-select input, and the combined velocity error is enabled onto the data bus 280 from the R register 304 and is multiplied by the coefficient K=1/32. The ALU 290 is set to the add mode, and the weighted combined velocity error is added to the old averaged velocity error taken from the H register 292 to provide a new averaged velocity error. The latter value is then stored in the RAM 302 address N for later use, replacing the old value.

Next the random error separating routine of FIG. 11 is initiated and the combined velocity error in RAM 302 is read into the R register 304. The combined velocity error in the R register 304 is enabled onto the data bus 280, and buffer 288 is enabled to bypass the K multiplier means 281. The combined velocity error is clocked from the buffer 288 into the H register 292. The averaged velocity error is read from the RAM 302 address N into the R register 304. The averaged velocity error from the R register 304 is enabled onto the data bus 280 and is bypassed around the K multiplier means 281 via the buffer 288. The ALU 290 is set to the subtract mode via the ALU mode input and the averaged velocity error is subtracted from the combined velocity error being held in the H register 292, to provide the random velocity error. The latter signal is loaded into the RAM 302 via the W register 298 for later use.

The RAM address incrementing routine of FIG. 12 begins by setting the sample number n to n+1. It is next determined if n is greater than 525, (625 in PAL), the total number of samples averaged per frame. If not, the routine ends and initiates the first step of the FIG. 9 routine, namely, waits for the next burst sample to arrive. If yes, n is set to one and then initiates the FIG. 9 routine. The cycle of routines continues for each line of video, through 525 samples in the NTSC standard to provide continuously updated new averaged velocity errors and the separated random velocity errors.

FIG. 13 depicts the repetitive velocity error compensating routine executed by the hardware of FIG. 15 and using the error interlace technique. The routine operates concurrently with the routine cycle depicted in FIG. 9, and controls the various components of FIG. 15. Thus, the routine begins by determining that a new impact velocity error sample is ready from the averaging routine of FIG. 10. If yes, the averaged impact velocity error from the FIG. 10 routine is read from the proper field of RAM 302, is multiplied by K=½ in K multiplier 82, and is added to the old frequency via the summing means 86 of FIG. 15, (as depicted by the frequency accumulator circuit 210 in FIGS. 7A,7B) to form a new frequency. The new frequency is stored in a register of the register bank 88, as depicted by the register 214 of FIGS. 7A, 7B. The ramp in a second register is reset and the sub-routine returns to the first step to await the arrival of the next impact velocity error sample. This sub-routine generates the first order correction information for each line of video being corrected in a present field.

Simultaneously, between bursts, the second subroutine of FIG. 13 cycles at a higher rate to provide the second order correction information with error information taken from vertically adjacent bursts of the previous field, as described above in FIGS. 4-6. To this end, the averaged impact velocity error, delayed by one field, and which has been multiplied by the scaling constant K=15,735/360° in the K-multiplier 82, is added to the old ramp value and the resulting new ramp value is stored in a second register of the register bank 88. The current ramp value is added to the current frequency value generated via the first sub-routine, and the summed value is sent to the clock oscillator circuit 80, and particularly to the frequency synthesizer means 90 thereof in FIG. 15. The sub-routine then waits for the next clock arrival (for example, the 2.5 MHz clock), at which time it returns to the top of the routine to continue the second sub-routine until the arrival of the next impact velocity error sample.

FIG. 14 depicts an alternate time base corrector embodiment in which the invention may be used, wherein velocity error correction is performed at the reference clock side of the time base corrector 41, rather than at the tape clock side as depicted in FIG. 2. The combined frequency control signal on bus 78 of FIG. 2 is used to perform velocity error correction via adjusting the timing of the A/D sampling clock, while applying a preselected constant reference clock to the D/A converter 45. In FIG. 14, the combined frequency control signal on bus 78 is used to perform velocity error correction by adjusting the timing of the clock supplied to the D/A converter 45, while providing an off-tape A/D sampling clock that is not velocity compensated. To this end, the A/D converter 34 samples the off-tape video at a slowly changing rate determined by an off-tape phase lock oscillator circuit 310, in response to a burst signal on a line 316 indicative of the timing of the off-tape color bursts in the video signal. The sampled video data are loaded into the time base corrector memory in response to the A/D clock from the phase lock oscillator circuit 310. The phase lock oscillator circuit 310 also supplies the burst phase error information in the conventional fashion of the time base corrector herein. The error information is delayed by a TBC delay 312 for a delay period corresponding to the delay of the video signal through the time base corrector 41 path, in order to synchronize the burst phase error information with the sampled video. The delayed error information then is fed to the dashed block at numeral 314 which includes therein the various components of FIG. 2, beginning after the A/D converter 34 and extending generally through the summing means 70 to the bus 78. The combined velocity compensating circuits 314 may include the frame averager 48, the repetitive velocity error subtractor 52 circuitry and the repetitive and random velocity error compensating circuits 66, 74, respectively of previous description. Thus the invention may be employed as an integral part of either of the time base corrector environments of FIGS. 2 or 14 to optimize the velocity error compensation thereof, and particularly the repetitive velocity error compensation.

Although the invention is herein described with reference to a video signal, it is readily applicable to other signals such as audio, satellite transmission, etc, signals, which have a periodically measurable time base reference signal component. In such signals the "burst" used herein is replaced by a reference pulse, while a "line" then is defined as the interval between reference pulses, and a "frame" is the period of the repetitive error or disturbance. The concepts of the invention then may be used to average and thus enhance the repetitive errors and then to compensate same.

What is claimed is:

1. A system for measuring repetitive velocity errors in a horizontal scan line of a video signal, comprising:
   means for supplying samples of the repetitive velocity error in a selected scan line of a first field;
   means responsive to the supplying means for generating a first order correction value for the selected scan line with data from the first field;
   means responsive to the supplying means for generating a higher order correction value for the selected scan line from spatially adjacent data from a second field; and
   means for modifying the first order correction value from the first field with the higher order correction value from the second field to provide the repetitive velocity error in the selected scan line.

2. The system of claim 1 including:
   means for supplying samples of the spatially adjacent data of the second field which are spatially centered about a mid point location of the selected scan line of the first field, to the higher order correction means.

3. The system of claim 1 wherein the higher order correction means includes field delay means for storing the data of the second field.

4. The system of claim 3 wherein the higher order correction means further includes:
   means for weighting the data taken from the second field; and
   integrating means responsive to the weighting means for generating a frequency ramp slope from the second field data which is indicative of the phase curvature of the repetitive velocity error in the selected scan line of the first field.

5. The system of claim 4 wherein:
the first order correction means includes digital frequency accumulator means for generating a constant frequency control signal; and
the modifying means includes summing means for adding the frequency ramp slope to the constant frequency control signal to provide a total repetitive error frequency control signal.

6. A system for measuring repetitive velocity errors in a horizontal scan line of a reproduced video signal, comprising:
means for supply a first value indicative of the repetitive velocity error in a selected horizontal scan line of a first field;
means for predicating the phase curvature of the repetitive velocity error in the selected horizontal scan line from adjacent samples taken from a second field; and
means for modifying the first value of the repetitive velocity error from the first field with the predicated phase curvature taken from the samples of the second field to provide the repetitive velocity error.

7. The system of claim 6 wherein the predicting means includes:
field delay means for storing and supplying the adjacent second field samples after a one-field delay; and
integrating means coupled to the field delay means for generating a frequency ramp slope indicative of the phase curvature of the repetitive velocity error in the selected horizontal scan line.

8. The system of claim 7 wherein the modifying means includes summing means operatively coupled to the integrating means and supplying means for generating a total frequency control signal indicative of the repetitive velocity error in the selected horizontal scan line.

9. The system of claim 8 further including:
clock oscillator means for generating a check signal whose frequency is continuously adjusted to substantially match the frequency of the reproduced video signal in response to the total frequency control signal to compensate for the repetitive velocity error.

10. A method for measuring repetitive velocity errors in a horizontal scan line of a video signal, comprising:
supplying a first repetitive velocity error value from data taken from a selected horizontal scan line of a first field;
predicting the phase curvature of the repetitive velocity error in the selected scan line of the first field from data taken from adjacent scan lines of a second field; and
modifying the first repetitive velocity error value taken from the first field with the predicted phase curvature thereof taken from the data in the second field.

11. The method of claim 10 including:
delaying the data for a period of a field to provide data from the adjacent scan lines of the second field which are spatially centered at a mid location of the selected horizontal scan line in the first field.

12. The method of claim 11 including:
integrating the delayed data from the second field to generate a frequency ramp having a slope indicative of the predicated curvature of the repetitive velocity error in the selected horizontal scan line of the first field.

13. The method of claim 12 wherein:
the step of supplying includes generating a constant frequency control signal indicative of a first order correction of the repetitive velocity error; and
the step of modifying includes adding the frequency ramp to the constant frequency control signal to provide a total frequency control signal indicative of the repetitive velocity error in the selected horizontal scan 14. The method of claim 12 including:
selectively weighting the delayed data prior to the step of integrating.

15. The method of claim 12 including:
generating a clock signal whose frequency substantially matches the frequency of the video signal in response to the total frequency control signal to compensate for the repetitive velocity error.

16. A method for separating repetitive from random velocity error signals in horizontal scan lines of a video signal, comprising;
supplying samples indicative of the velocity errors in respective scan lines for a selected plurality of video frames;
averaging the samples indicative of the velocity errors in the respective scan lines over the succession of frames to enhance and thus separate the repetitive velocity errors while cancelling the random velocity errors;
said step of averaging including;
temporarily storing a frame of averaged weighted velocity error samples:
adding weighted incoming error samples for respective lines with the previous weighted averages for the same respective lines to supply a frame of new averaged velocity error samples; and
subtracting the repetitive velocity error signal obtained by averaging the samples over the plurality of video frames from the initial velocity error signal to obtain the random velocity error signal.

17. The method of claim 16 wherein the step of averaging includes:
weighting incoming velocity error samples with a first selected fractional constant commensurate with the selected plurality of frames being averaged;
weighting the stored averaged velocity error samples with a second selected fractional constant which is the complement of the first fractional constant;
adding the sets of weighted samples together to provide new averaged velocity error samples;
storing the new averaged velocity error samples; and
repeating the weighting, adding and storing steps for the plurality of frames to provide the enhanced and separated repetitive velocity errors.

18. The method of claim 16 further including:
generating a repetitive frequency control signal indicative of the repetitive velocity errors;
generating a random frequency control signal indicative of the random velocity errors; and
adding the two frequency control signals to provide a combined velocity error frequency control signal.

19. The method of claim 18 including:
compensating the repetitive and random velocity error signals contained in the video signal in response to the combined velocity error frequency control signal.

20. A system for separating repetitive velocity errors from random velocity errors in the horizontal scan lines of selected frames of a video signal, comprising:
   means for supplying measured error values of the velocity errors;
   means responsive to the supplying means for averaging the measured error values of each line over successive frames to provide averaged error values;
   means integral with the averaging means for storing the averaged error values of the measured error values;
   means for continuously adding incoming measured error values to the respective previously averaged error values in the storing means to provide new averaged error values corresponding to the separated repetitive velocity errors;
   means for selectively weighting the incoming measured error values by a first selected weighting factor, and the stored averaged error values being summed by a second factor which is the complement of the first weighting factor; and
   means for substracting the new averaged error values which are averaged over the selected frames from the measured values of the velocity errors to provide the separated random velocity errors.

21. The system of claim 20 wherein the means for selectively weighting includes:
   first multiplying means for multiplying the incoming measured error values by a first fractional constant; and
   second multiplying means for multiplying the stored averaged error values by a second fractional constant.

22. The system of claim 20 wherein the adding means sums the weighted incoming measured error values to the weighted stored averaged error values to provide the new averaged error values.

23. The system of claim 20 wherein the storing means includes random access memory means capable of storing a frame of averaged error values, the adding means includes arithmetic logic unit means, and the weighting means includes multiplier programmable read only memory means.

24. A method for compensating repetitive and random velocity errors contained in horizontal scan lines of successive frames of a video signal, comprising:
   supplying a measured value of the velocity error in each line of the successive frames of the video signal;
   averaging the measured velocity error values of each line for the successive frames to enhance and thus separate the repetitive velocity errors while cancelling the random velocity errors;
   subtracting the averaged repetitive velocity errors from the measured velocity errors to provide the random velocity errors;
   generating a repetitive error frequency control signal and a random error frequency control signal from the averaged repetitive velocity errors and the random velocity errors, respectively; and
   summing the repetitive and random error frequency control signals to provide a combined velocity error frequency control signal for compensating the velocity errors in the video signal.

25. The method of claim wherein the step of supplying includes:
   sampling the velocity errors at horizontal line scan rate over first and second fields of each frame of the successive frames.

26. The method of claim 24 wherein the step of averaging includes:
   storing an error average for each line of the successive frames;
   weighting an incoming given line's error and the stored error average;
   summing the weighted given line error with the previous weighted average for the given line to provide a new average for the given line in successive frames; and
   repeating the steps of storing, weighting and summing for the successive frames.

27. The method of claim 26 wherein the plurality of successive frames is of the order of from 4 to 60, and the weighting factor is a constant of the order of from $\frac{1}{4}$ to 1/60, respectively.

28. The method of claim 24 further including:
   generating a clock signal whose frequency is continuously adjusted in response to the combined velocity error frequency control signal; and
   compensating the repetitive and random velocity errors contained in the video signal in response to the clock signal.

29. The method of claim wherein the step of generating a repetitive error frequency control signal includes:
   supplying a first repetitive velocity error value from data taken from a selected scan line of a first field;
   predicting the phase curvature of the repetitive velocity error in the selected scan line from data taken from adjacent scan lines of a second field; and
   modifying the first repetitive velocity error value taken from the first field with the predicted phase curvature taken from the data in the second field.

30. A system for compensating repetitive and random velocity errors in horizontal scan lines of successive frames of a video signal reproduced from a recording medium, comprising:
   means for supplying measured velocity errors for respective lines of successive video frames;
   means for continuously averaging the measured velocity errors in respective lines of the video frames to enhance the repetitive velocity errors while cancelling the random velocity errors;
   means for subtracting the enhanced repetitive velocity errors from the measured velocity errors to separate the random velocity errors; and
   means for generating a combined velocity error frequency control signal commensurate with the enhanced repetitive velocity errors and the random velocity errors to compensate for the random and repetitive velocity errors in the video signal.

31. The system of claim 30 wherein the averaging means includes:
   frame delay means for storing the averaged velocity errors for respective lines of the successive frames; and
   summing means for successively adding an incoming measured velocity error to the stored averaged velocity error to provide a new averaged velocity error.

32. The system of claim 31 further including:

multiplying means for fractionally weighting the incoming measured velocity error and the stored averaged velocity error prior to adding the errors together.

33. The system of claim 30 wherein the generating means includes:
  random velocity error compensating means for generating a random error frequency control signal;
  repetitive velocity error compensating means for generating a repetitive error frequency control signal;
  said repetitive velocity error compensating means including field delay means for providing repetitive error curvature prediction data from a selected field of the frame to correct the repetitive velocity error in another field.

34. The system of claim 33 wherein the repetitive velocity error compensating means includes:
  first order correction means disposed to receive the enhanced repetitive error frequency control signal;
  higher order correction means operatively coupled to the field delay means for generating a second repetitive error frequency control signal indicative of the repetitive error curvature; and
  summing means for adding the first and second repetitive error frequency control signals.

35. A system for measuring repetitive velocity errors in a given interval of a signal having a periodically measurable time base reference signal component including periodically measurable reference pulses, wherein an interval is a selected interval between reference pulses and a period is a period of the velocity error, comprising:
  means for supplying samples of the repetitive velocity error in the selected interval in a first half of the period;
  means for generating a first order correction value for the selected interval in the first half of the period;
  means for generating a higher order correction value for the selected interval from spatially adjacent data of a second half of the period; and
  means for modifying the first order correction value with the higher order correction value to provide the repetitive velocity error in the selected interval.

36. A method for compensating repetitive and random velocity errors contained in intervals of successive periods of a signal having a periodically measurable time base reference signal component including periodically measurable reference pulses, wherein an interval is the interval between reference pulses and a period is the period of the velocity error, comprising:
  supplying a measured value of the velocity error in each interval of the successive periods of the signal;
  averaging the measured velocity error values of each interval for the successive periods to enhance and thus separate the repetitive velocity errors while cancelling the random velocity errors;
  substracting the averaged repetitive velocity errors from the measured velocity errors to provide the random velocity errors;
  generating a repetitive error frequency contrl signal and a random error frequency control signal from the overaged repetitive velocity errors and the random velocity errors, respectively; and
  summing the repetitive and random error frequency control signals to provide a combined velocity error frequency control signal; and
  adjusting the frequency of a sampling clock frequency which is sampling said signal, in response to the combined velocity error frequency control signal, to match the sampling clock frequency to the signal frequency.

* * * * *